US011166247B2

(12) United States Patent
Fu et al.

(10) Patent No.: US 11,166,247 B2
(45) Date of Patent: Nov. 2, 2021

(54) APPARATUS AND METHOD FOR DETERMINING TIMING RELATIONSHIP IN WIRELESS COMMUNICATION SYSTEM

(71) Applicant: SAMSUNG ELECTRONICS CO., LTD., Suwon-si (KR)

(72) Inventors: Jingxing Fu, Beijing (CN); Bin Yu, Beijing (CN); Chen Qian, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/685,380

(22) Filed: Nov. 15, 2019

(65) Prior Publication Data
US 2020/0163035 A1 May 21, 2020

(30) Foreign Application Priority Data

Nov. 16, 2018 (CN) .......................... 201811372304.5
Apr. 17, 2019 (CN) .......................... 201910311717.0

(51) Int. Cl.
*H04W 56/00* (2009.01)
*H04L 5/00* (2006.01)
(Continued)

(52) U.S. Cl.
CPC ....... *H04W 56/0005* (2013.01); *H04L 1/1819* (2013.01); *H04L 5/0055* (2013.01); *H04W 56/001* (2013.01); *H04W 72/1278* (2013.01)

(58) Field of Classification Search
CPC ........... H04W 56/0005; H04W 56/001; H04W 72/1278; H04L 1/1819; H04L 5/0055
See application file for complete search history.

(56) References Cited

U.S. PATENT DOCUMENTS

| 2018/0206263 | A1  | 7/2018 | Lin |
| 2018/0263064 | A1* | 9/2018 | Islam ................ H04W 72/1205 |
| 2018/0279360 | A1  | 9/2018 | Park et al. |

OTHER PUBLICATIONS

Samsung, "On cross-slot scheduling power saving techniques", 3GPP TSG RAN WG1 #97, May 17, 2019, 5 pages.
(Continued)

*Primary Examiner* — Eric Myers
(74) *Attorney, Agent, or Firm* — Nixon & Vanderhye P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Example embodiments of the present disclosure relate to the field of wireless communication technologies, and for example, to a method for determining a timing relationship, including: receiving a timing relationship set indication indicating a timing relationship set for use at a User Equipment (UE); determining the timing relationship set based on the timing relationship set indication; receiving timing relationship indication information indicating a timing relationship for use at the UE; and determining the timing relationship for use at the UE based on the timing relationship set and the timing relationship indication information. The disclosure implements a method and apparatus for dynamically changing a timing relationship set, saves power consumption of the UE, and ensures timely data transmission.

20 Claims, 18 Drawing Sheets

(51) Int. Cl.
*H04L 1/18* (2006.01)
*H04W 72/12* (2009.01)

(56) References Cited

OTHER PUBLICATIONS

Samsung, "Cross-slot scheduling power saving techniques", 3GPP TSG RAN WG1 #98, Aug. 26-30, 2019, 10 pages.
International Search Report and Written Opinion dated Mar. 4, 2020 in counterpart International Patent Application No. PCT/KR2019/015673.
Samsung, "Support of Flexible Scheduling Timing," R1-1609133, 3GPP TSG RAN WG1 #86bis, Lisbon, Portugal, Sep. 30, 2016, Sections 2,5.
Huawei et al., "On physical channel timing relationships," R1-155109, 3GPP TSG RAN WG1 Meeting #82bis, Malmo, Sweden, Sep. 25, 2015, section 2.
Nokia Networks, "Timing Relationship Considerations for MTC," R1-153824, 3GPP TSG-RAN WG1 Meeting #82, Beijing, China, Aug. 14, 2015, section 2.

* cited by examiner

APPARATUS AND METHOD FOR DETERMINING TIMING RELATIONSHIP IN WIRELESS COMMUNICATION SYSTEM

CROSS-REFERENCE TO RELATED APPLICATIONS

This application is based on and claim priority under 35 U.S.C. § 119 to Chinese Patent Application No. 201811372304.5, filed Nov. 16, 2018, and Chinese Patent Application No. 201910311717.0, filed Apr. 17, 2019, in the Chinese Patent Office, the disclosures of which are incorporated by reference herein in their entireties.

BACKGROUND

Field

The disclosure relates to the field of wireless communication, and for example, to an apparatus and a method for determining a timing relationship in a wireless communication system.

Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a new radio (NR) air interface system, a physical downlink control channel (PDCCH) and a data channel scheduled by the PDCCH may or may not be transmitted in the same time unit.

A timing relationship between the PDCCH and the data channel scheduled by the PDCCH is indicated by a specific value in a predetermined timing relationship set. Generally, before signaling (for example, PDCCH) indicating the specific value is received, data transmission needs to be prepared according to a minimum value in the timing relationship set. The smaller the minimum value in the timing relationship set is, the higher the preparation requirement is, the higher the processing strength requirement of the UE has, and the more power the UE consumes. On the other hand, the larger the minimum value in the timing relationship set is, the lower the preparation requirement is, the lower the processing strength requirement of the UE has, and the less power the UE consumes. However, in this case, a relatively small amount of data may be transmitted and the data transmission may have a relatively large delay.

In view of this, there is a need for a technical solution which can balance the resource consumption at the UE and requirements for the data transmission.

SUMMARY

Embodiments of the disclosure provide a method and device for determining a timing relationship and a storage medium.

According to a first example aspect of the disclosure, a method for determining a timing relationship is provided, the method comprising, receiving a timing relationship set indication indicating a timing relationship set for use at a user equipment (UE), determining the timing relationship set based on the timing relationship set indication, receiving timing relationship indication information indicating a timing relationship for use at the UE, and determining the timing relationship to be used at the UE based on the timing relationship set and the timing relationship indication information.

In various example embodiments, the timing relationship set indication comprises at least one of the following information: a field related to the timing relationship set in a physical downlink control channel (PDCCH) which schedules a physical downlink shared channel (PDSCH), a field related to the timing relationship set in a PDCCH which does not schedule a PDSCH, a reference signal, other control information that is to be dynamically changed, information transmitted with the other control information that is to be dynamically changed, and constraints on a set comprising the timing relationship set.

In various example embodiments, the determined timing relationship set indicates that a change of a timing relationship set has occurred. In this case, determining the timing relationship to be used at the UE based on the timing relationship set and the timing relationship indication information comprises, determining, within a predetermined time period after determining that a change of a timing relationship set has occurred, the timing relationship for use at the UE based on the timing relationship set before the change and the timing relationship indication information, and preparing data transmission based on a minimum value in the timing relationship set before the change, and based on the predetermined time period elapsing, determining the timing relationship for use at the UE based on the changed timing relationship set and the timing relationship indication information, and preparing data transmission based on a minimum value in the changed timing relationship set.

In various example embodiments, the determined timing relationship set indicates that a change of a timing relationship set has occurred. In this case, determining the timing relationship for use at the UE based on the timing relationship set and the timing relationship indication information comprises, determining the timing relationship for use at the UE based on the changed timing relationship set and timing relationship indication information, based on, within a predetermined time period after determining that a change of a timing relationship set has occurred, a value of the timing relationship indicated by the timing relationship indication information being less than a minimum value in the timing relationship set before the change, abandoning data transmission before the timing relationship indicated by the timing relationship indication information, and preparing data transmission based on a minimum value in the timing relationship set before the change, and based on the predetermined time period after determining that the change of the timing relationship set has occurred elapsing, preparing data transmission based on a minimum value in the changed timing relationship set.

In various example embodiments, the timing relationship in the timing relationship set indicates at least one of a timing relationship between the PDCCH and the PDSCH to be scheduled by the PDCCH, a timing relationship between the PDSCH and a hybrid automatic repeat request acknowledgement thereof, and a timing relationship between the PDCCH and a Physical Uplink Shared Channel (PUSCH) to be scheduled by the PDCCH.

In various example embodiments, based on the timing relationship set comprising a plurality of different types of timing relationship sets, the plurality of different types of timing relationship sets are indicated respectively or are indicated jointly.

According to a second example aspect of the disclosure, a method for determining a timing relationship is provided, the method comprising selecting a timing relationship set for use for a User Equipment (UE) from a plurality of timing relationship sets based on data transmission of the UE, transmitting a timing relationship set indication indicating the selected timing relationship set to the UE, determining a timing relationship for use for the UE in the selected timing relationship set, and transmitting a timing relationship indication indicating the selected timing relationship to the UE.

In various example embodiments, selecting a timing relationship for use for a User Equipment (UE) from a plurality of timing relationship sets based on data transmission of the UE comprises, determining the timing relationship set to be used for the UE based on a size of an amount of data to be transmitted by the UE and requirements for delay of data transmission.

In various example embodiments, determining a timing relationship to be used for the UE in the selected timing relationship set comprises, based on the selected timing relationship set being different from a timing relationship set previously selected for the UE, selecting, within a predetermined time period, from the selected timing relationship set, a timing relationship having a value not less than a minimum value in the timing relationship set previously selected for the UE, for use for the UE.

According to yet another example aspect of the disclosure, a User Equipment (UE) is provided, the UE comprising, a set indication receiving module comprising receiving circuitry configured to receive a timing relationship set indication indicating a timing relationship for use at the UE, a timing relationship set determination module comprising circuitry configured to determine the timing relationship set based on the timing relationship set indication, a relationship indication receiving module comprising circuitry configured to receive timing relationship indication information indicating a timing relationship for use at the UE, and a timing relationship determination module comprising circuitry configured to determine the timing relationship to be used at the UE based on the timing relationship set and the timing relationship indication information.

According to another example aspect of the disclosure, a User Equipment (UE) is provided, the UE comprising, a processor, and a storage configured to store machine readable instructions, which when executed by the processor, cause the processor to control the UE to perform the method according to the first example aspect.

According to another example aspect of the disclosure, a base station is provided, the base station comprising, a timing relationship set selection module comprising circuitry configured to select, from a plurality of timing relationship sets, a timing relationship for use for a user equipment (UE), a timing relationship set indication module comprising circuitry configured to transmit indication information indicating the selected timing relationship set to the UE, a timing relationship determination module comprising circuitry configured to determine a timing relationship for use for the UE in the selected timing relationship set, and a timing relationship indication module comprising circuitry configured to transmit indication information for indicating the selected timing relationship to the UE.

According to another example aspect of the disclosure, a base station is provided, the base station comprising, a processor, and a storage configured to store machine readable instructions, which when executed by the processor, configure the processor to control the base station to perform the method according to the second example aspect.

According to another example aspect of the disclosure, a non-transitory computer readable storage medium is provided, the non-transitory computer readable storage medium, having stored thereon executable instructions which, when executed by a processor, cause the processor to perform the method according to the first aspect or the second aspect.

In various example embodiments of the disclosure, the selection of the timing relationship set for the user equipment is dynamically indicated using the timing relationship set indication, which implements dynamic change of the timing relationship set, saves power consumption of the UE, and ensures timely data transmission.

BRIEF DESCRIPTION OF THE DRAWINGS

The above and other aspect, features and advantages of certain embodiments of the present disclosure will be more apparent from the following detailed description, taken in conjunction with the accompanying drawings, in which.

In the accompanying drawings, like reference numerals refer to like elements.

DETAILED DESCRIPTION

Figure 1:
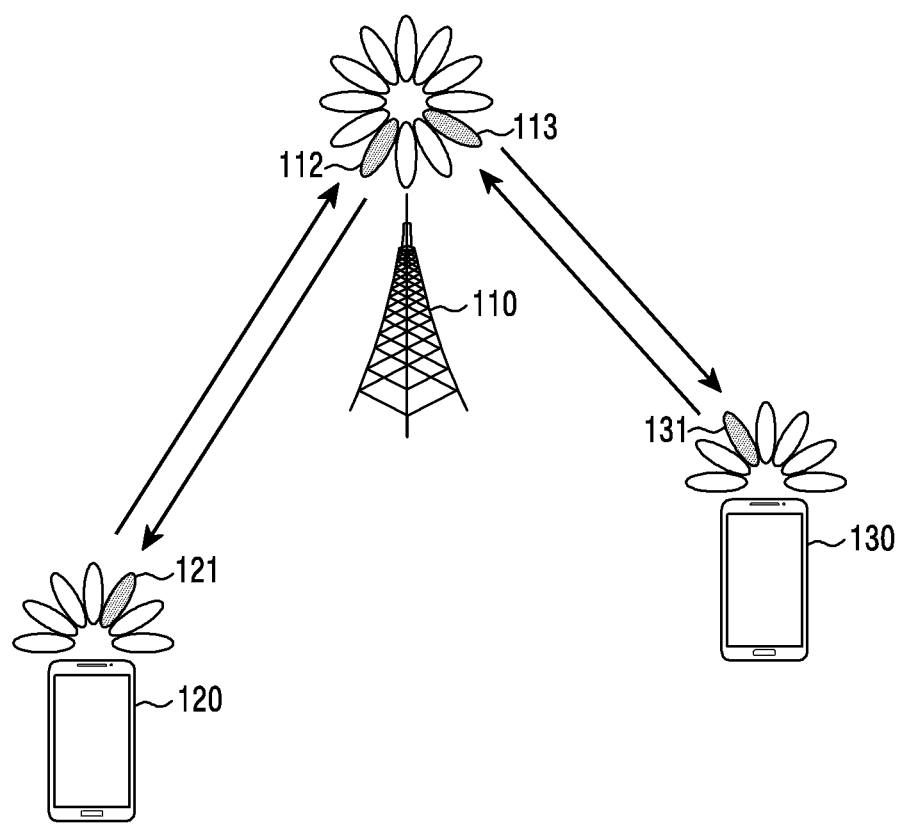
FIG. 1 illustrates a wireless communication system according to an embodiment.

The various example embodiments of the disclosure will be described in greater detail below, and examples of the embodiments are illustrated in the accompanying drawings, throughout which the same or similar reference signs are used to refer to the same or similar elements or elements having the same or similar functions. The various example embodiments described below with reference to the accompanying drawings are intended to be illustrative only, and are merely used to explain the disclosure, but should not be understood as limiting the disclosure.

It will be understood by those skilled in the art that singular forms "a", "an", "the" used here may also include plural forms, unless otherwise stated. It should also be understood that phrase "comprise" used in the disclosure may refer to presence of the features, integers, steps, operations, elements and/or components, but should not preclude the presence or addition of one or more other features, integers, steps, operations, elements, components, and/or groups thereof. It should be understood that when an element is referred to as being "connected" or "coupled" to another element, it may be directly connected or coupled to the other element, or there may be an intermediate element therebetween. Further, "connected" or "coupled" as used here may include, for example, a wireless connection or a wireless coupling. The phrase "and/or" used here includes all or any of one or more of associated listed items, or all combinations thereof.

It will be understood by those skilled in the art terms (comprising technical and scientific terms) used here have the same meaning as commonly understood by those of ordinary skill in the art to which the disclosure belongs, unless otherwise defined. It should also be understood that terms such as those defined in a general dictionary should be understood to have meaning consistent with the meaning in the context of the related art, and will not be explained as an idealized or excessively formal meaning unless specifically defined as here.

It may be understood by those skilled in the art that the "terminal" and "terminal device" used here include not only a wireless signal receiver device, which has only a wireless signal receiver without a transmitting capability, but also includes a receiving and transmitting hardware device which is capable of two-way communication over a two-way communication link. Such a device may, for example, and without limitation, include: a cellular or other communication device which may comprise a single line display or a multi-line display or may not comprise a multi-line display; a personal communication service (PCS), which may comprise voice, data processing, fax, and/or data communication capabilities; a personal digital assistant (PDA), which may comprise a radio frequency receiver, a pager, Internet/Intranet access, a web browser, a notepad, a calendar, and/or a global positioning system (GPS) receiver; a conventional laptop and/or palmtop computer or other device having and/or comprising a radio frequency receiver, or the like. The "terminal" and "terminal device" used here may, for example, and without limitation, be portable, transportable, installed in transportations (aviation transportations, sea transportations and/or land transportations), adapted and/or configured to operate locally, and/or operate in any other location on the earth and/or space in a distributed form. The "terminal" and "terminal device" used here may also include, for example, and without limitation, communication terminals, internet terminals, music/video playing terminals, or the like, for example, PDAs, mobile internet devices (MIDs), and/or mobile phones having music/video playback functions, or may also be devices such as smart TVs, set-top boxes etc.

FIG. 1 illustrates a wireless communication system according to an embodiment. FIG. 1 depicts a base station 110, a terminal 120, and a terminal 130 as some of nodes that use a radio channel in the wireless communication system. While FIG. 1 depicts a single base station, another base station that is the same as or similar to the base station 110 may be further included.

The base station 110 is a network infrastructure that provides radio access to the terminals 120 and 130. The base station 110 has coverage defined as a geographical area based on a signal transmission distance. The base station 110 may be referred to as an access point (AP), an eNodeB (eNB), a 5th generation node (5G node), a next generation nodeB (gNB), a wireless point, a transmission/reception point (TRP), or other terms having a technically equivalent meaning.

The terminal 120 and the terminal 130 are each used by a user and communicate with the base station 110 over a radio (or wireless) channel. In some cases, at least one of the terminal 120 and the terminal 130 may operate without a user's involvement. That is, at least one of the terminal 120 and the terminal 130 may perform machine type communication (MTC) and may not be carried by the user. The terminal 120 and the terminal 130 each may be referred to as a user equipment (UE), a mobile station, a subscriber station, a remote terminal, a wireless terminal, a user device, or other terms having a technically equivalent meaning.

The base station 110, the terminal 120, and the terminal 130 may transmit and receive radio signals (e.g., wireless signals) in a millimeter wave (mmWave) band (e.g., 28 GHz, 30 GHz, 38 GHz, 60 GHz). To improve channel gain, the base station 110, the terminal 120, and the terminal 130 may conduct (or perform) beamforming. Herein, the beamforming may include transmit beamforming (or transmission beamforming) and receive beamforming (or reception beamforming). That is, the base station 110, the terminal 120, and the terminal 130 may apply directivity to a transmit signal or a receive signal. To this end, the base station 110 and the terminals 120 and 130 may select serving beams 112, 113, 121, and 131 through a beam search or beam management procedure. After the serving beams 112, 113, 121, and 131 are selected, communications may be performed using resources that are quasi co-located (QCL) with resources used for transmitting the serving beams 112, 113, 121, and 131.

If large-scale properties of a channel that carries a symbol on a first antenna port may be inferred from a channel that carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

Figure 2:
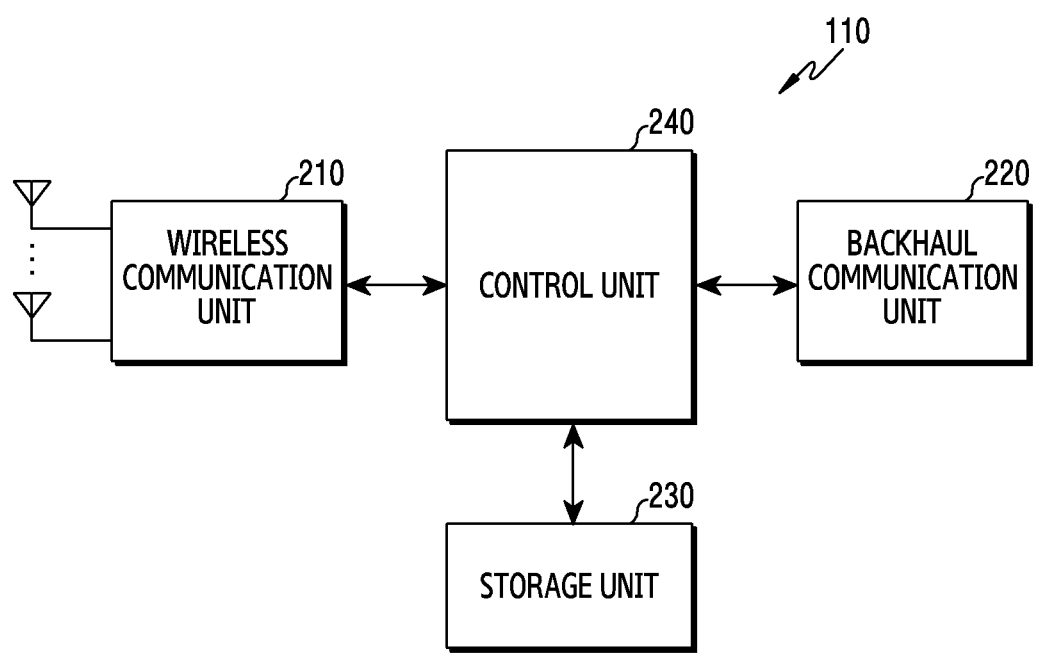
FIG. 2 illustrates a base station in a wireless communication system according to an embodiment.

FIG. 2 illustrates a base station 110 in a wireless communication system according to an embodiment. FIG. 2 depicts a configuration of the base station 110. In the following description, it is understood that a term such as "module", "unit", "portion", "-or" or "-er" indicates a unit for processing at least one function or operation, and may be implemented using hardware, software, or a combination of hardware and software.

Referring to FIG. 2, the base station 110 includes a wireless communication unit 210 (e.g., wireless communicator or wireless communication interface), a backhaul communication unit 220 (e.g., backhaul communicator or backhaul communication interface), a storage unit 230 (e.g., storage), and a control unit 240 (e.g., at least one processing device).

The wireless communication unit 210 may transmit and receive signals over a radio (or wireless) channel. For example, the wireless communication unit 210 performs a conversion function between a baseband signal and a bit string (or bit stream) according to a physical layer standard of the system. By way of further example, when data is transmitted, the wireless communication unit 210 generates complex symbols by encoding and modulating a transmit bit string (or transmission bit stream). Similarly, when data is received, the wireless communication unit 210 restores a receive bit string (or reception bit stream) by demodulating and decoding a baseband signal.

Furthermore, the wireless communication unit 210 up-converts the baseband signal to a radio frequency (RF) band signal, transmits the RF band signal via an antenna, and down-converts an RF band signal received via an antenna to a baseband signal. To this end, the wireless communication unit 210 may include at least one of a transmit filter, a receive filter, an amplifier, a mixer, an oscillator, a digital to analog convertor (DAC), an analog to digital convertor (ADC), and the like. In addition, the wireless communication unit 210 may include or utilize a plurality of transmit (or transmission) and receive (or reception) paths. Further, the wireless communication unit 210 may include at least one antenna array including a plurality of antenna elements.

In terms of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As described above, the wireless communication unit 210 transmits and receives signals. Hence, the entirety or a part of the wireless communication unit 210 may be referred to as a transmitter, a receiver, or a transceiver. Hereinbelow, transmission and the reception over a radio (or wireless) channel may include the above-described processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string.

The storage unit 230 stores data, such as a basic program, an application program, configuration information, settings, and the like for operating the base station. The storage unit 230 may include a volatile memory, a non-volatile memory, or a combination of a volatile memory and a non-volatile memory. The storage unit 230 provides the stored data in response to a request from the control unit 240.

The control unit 240 controls general operations of the base station. For example, the control unit 240 transmits and receives signals through the wireless communication unit 210 or the backhaul communication unit 220. Also, the control unit 240 records data to the storage unit 230 and reads data from the storage unit 230. The control unit 240 may execute functions of a protocol stack required by or included in a particular communication standard. According to another embodiment, the protocol stack may be included in and/or implemented via the wireless communication unit 210. To this end, the control unit 240 may include at least one processor.

According to an embodiment, the control unit 240 may determine at least one beam to communicate with a terminal (e.g., the terminal 120). For example, the control unit 240 may determine a transmit (or transmission) beam of the base station 110 based on a feedback from the terminal. Further, the control unit 240 may determine at least one of a receive (or reception) beam of the base station 110 and a transmit beam of the terminal using a signal transmitted from the terminal. Additionally, the control unit 240 may transmit information indicating the determined transmit beam of the terminal, to the terminal. For example, the control unit 240 may control the base station 110 to carry out operations explained below according to one or more embodiments.

Figure 3:
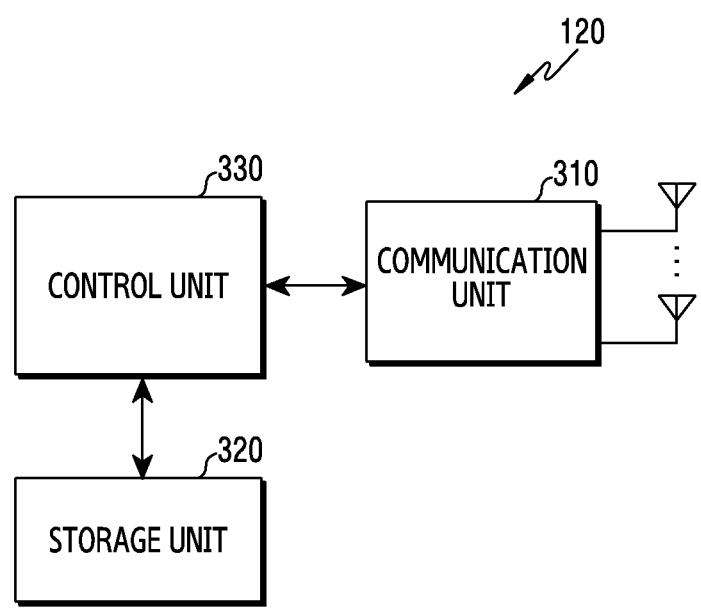
FIG. 3 illustrates a terminal in a wireless communication system according to an embodiment.

FIG. 3 illustrates a terminal 120 in a wireless communication system according to an embodiment. In the following description, it is understood that a term such as "module", "unit", "portion", "-or" or "-er" indicates a unit for processing at least one function or operation, and may be implemented using hardware, software, or a combination of hardware and software.

Referring to FIG. 3, the terminal 120 includes a communication unit 310 (e.g., communicator or communication interface), a storage unit 320 (e.g., storage), and a control unit 330 (e.g., at least one processor). By way of example, the terminal 120 may be a cellular phone or other device that communicates over a cellular network (such as a 5G or pre-5G network).

The communication unit 310 may transmit and receive signals over a radio channel. For example, the communication unit 310 performs a conversion function between a baseband signal and a bit string according to a physical layer standard of the system. By way of further example, when data is transmitted, the communication unit 310 generates complex symbols by encoding and modulating a transmit bit string. Similarly, when data is received, the communication unit 310 restores a receive bit string by demodulating and decoding a baseband signal. Furthermore, the communication unit 310 up-converts the baseband signal to an RF band signal, transmits the RF band signal via an antenna, and down-converts an RF band signal received via the antenna to a baseband signal. For example, the communication unit 310 may include at least one of a transmit filter, a receive filter, an amplifier, a mixer, an oscillator, a DAC, an ADC, and the like.

Also, the communication unit 310 may include or utilize a plurality of transmit and receive paths. Further, the communication unit 310 may include at least one antenna array including a plurality of antenna elements. In terms of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming.

As described above, the communication unit 310 transmits and receives signals. Hence, the entirety or a part of the communication unit 310 may be referred to as a transmitter, a receiver, or a transceiver. Hereinbelow, the transmission and the reception over the radio channel may include the above-described processing of the communication unit 310.

The storage unit 320 stores data, such as a basic program, an application program, configuration information, settings, and the like for operating the terminal. The storage unit 320 may include a volatile memory, a non-volatile memory, or a combination of a volatile memory and a non-volatile memory. The storage unit 320 provides the stored data according to a request from the control unit 330.

The control unit 330 controls general operations of the terminal. For example, the control unit 330 transmits and receives signals through the communication unit 310. Also, the control unit 330 records data to the storage unit 320 and reads data from the storage unit 320. The control unit 330 may execute functions of a protocol stack required by or included in a particular communication standard. To this end, the control unit 330 may include at least one processor or microprocessor, or may be part of a processor. Part of the communication unit 310 and the control unit 330 may be referred to as a communication processor (CP).

According to an embodiment, the control unit 330 may determine at least one beam for communication with a base station (e.g., the base station 110). For example, the control unit 330 may determine at least one of a receive beam of the terminal 120 and a transmit beam of the base station using a signal transmitted from the base station. Further, the control unit 330 may transmit information indicating the determined transmit beam of the base station, to the base station. For example, the control unit 330 may determine the transmit beam of the base station based on a request from the base station. Further, the control unit 330 may control the terminal to carry out operations, to be explained below, according to one or more embodiments.

Figure 4:
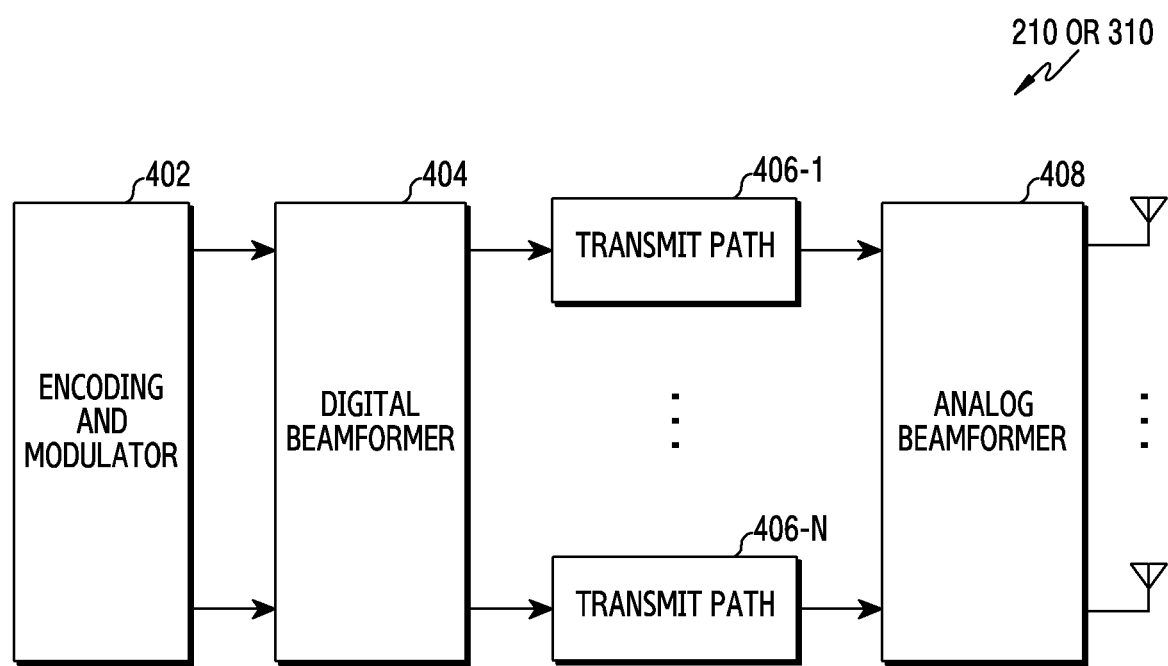
FIG. 4 illustrates a communication unit in a wireless communication system according to an embodiment.

FIG. 4 illustrates a communication unit 210 or 310 in a wireless communication system according to an embodiment. FIG. 4 depicts a detailed configuration of the wireless communication unit 210 of FIG. 2 or the communication unit 310 of FIG. 3. More specifically, FIG. 4 depicts components, as part of the wireless communication unit 210 of FIG. 2 or the communication unit 310 of FIG. 3, for performing the beamforming.

Referring to FIG. 4, the wireless communication unit 210 or the communication unit 310 includes an encoder and modulator 402, a digital beamformer 404, a plurality of transmit (or transmission) paths 406-1 through 406-N, and an analog beamformer 408.

The encoder and modulator 402 performs channel encoding. To perform the channel encoding, at least one of a low density parity check (LDPC) code, a convolution code, and a polar code may be used. The encoder and modulator 402 generates modulation symbols through constellation mapping.

The digital beamformer 404 beamforms a digital signal (e.g., the modulation symbols). To this end, the digital beamformer 404 may multiply or apply beamforming weights to the modulation symbols. Herein, the beamforming weights are used to change a level and a phase of a signal and may be referred to as a precoding matrix or a precoder. The digital beamformer 404 outputs the digital-beamformed modulation symbols to the plurality of transmit paths 406-1 through 406-N. In this case, according to a multiple input multiple output (MIMO) transmission scheme, the modulation symbols may be multiplexed or the same modulation symbols may be fed to the plurality of transmit paths 406-1 through 406-N.

The transmit paths 406-1 through 406-N convert the digital-beamformed digital signals to analog signals. To this end, the transmit paths 406-1 through 406-N each may include an inverse fast Fourier transform (IFFT) operator, a cyclic prefix (CP) adder or inserter, a DAC, and an up-converter. The CP adder is used for orthogonal frequency division multiplexing (OFDM), and may be excluded if another physical layer scheme (e.g., filter bank multi-carrier (FBMC)) is applied. That is, the transmit paths 406-1 through 406-N provide an independent signal process for a plurality of streams generated through the digital beamforming. Notably, depending on the implementation, some of the components of the transmit paths 406-1 through 406-N may be used in common.

The analog beamformer 408 beamforms the analog signals. To this end, the analog beamformer 408 may multiply or apply the beamforming weights to the analog signals. Herein, the beamforming weights are used to change the level and the phase of the signal. More specifically, the analog beamformer 408 may be variously configured, according to a connection structure between the transmit paths 406-1 through 406-N and the antennas. For example, the transmit paths 406-1 through 406-N each may be connected to one antenna array, or the transmit paths 406-1 through 406-N may be connected to one antenna array. Further, the transmit paths 406-1 through 406-N may be adaptively connected to one antenna array, or may be connected to two or more antenna arrays.

In an new radio (NR) air interface system, a physical downlink control channel (PDCCH) and a data channel scheduled by the PDCCH may or may not be transmitted in the same time unit. For example, the PDCCH is transmitted in a time unit (which is, for example, a time slot) n, and a physical downlink shared channel (PDSCH) scheduled by the PDCCH is transmitted in a time unit n+k0, wherein k0 is indicated by a field (denoted as a timing relationship of downlink assignment to downlink data) in the PDCCH which schedules the PDSCH. The field indicates an index of an element in a set which is called K0, for example, the set K0 is {0, 1, 2, 3}, which comprises 4 elements, and field indication values and the timing relationship k0 from downlink assignment to downlink data are shown, for example, in Table 1. Table 1 exemplifies a mapping rulebetween the field indication values and the timing relationship k0 from downlink assignment to downlink data.

TABLE 1

| Field indication value | k0 |
|---|---|
| 00 | 0 |
| 01 | 1 |
| 10 | 2 |
| 11 | 3 |

The PDSCH is transmitted in the time unit n, and a hybrid automatic repeat request-acknowledgement (HARQ-ACK) generated by the PDSCH is transmitted in a time unit n+k1, wherein k1 is indicated by a field (denoted as a PDSCH-to-HARQ-ACK timing relationship) in the PDCCH which schedules the PDSCH. The field indicates an index of an element in a set which is called K1, for example, the set K1 is {0, 1, 2, 3}, which comprises 4 elements, and field indication values and the timing relationship k1 from PDSCH to HARQ-ACK are shown, for example, in Table 2. Table 2 exemplifies a mapping rule between the field indication values and the timing relationship k1 from PDSCH to HARQ-ACK.

TABLE 2

| Field indication value | k1 |
|---|---|
| 00 | 0 |
| 01 | 1 |
| 10 | 2 |
| 11 | 3 |

The PDCCH is transmitted in a time unit (which is, for example, a time slot) n, and a Physical Uplink Shared Channel (PUSCH) scheduled by the PDCCH is transmitted in a time unit n+k2, wherein k2 is indicated by a field (denoted as a timing relationship of uplink assignment to uplink data) in the PDCCH which schedules the PUSCH. The field indicates an index of an element in a set which is called K2, for example, the set K2 is {0, 1, 2, 3}, which comprises 4 elements, and field indication values and the timing relationship k2 from uplink assignment to uplink data are shown, for example, in Table 3. Table 3 exemplifies a mapping rule between the field indication values and the timing relationship k2 from uplink assignment to uplink data.

TABLE 3

| Field indication value | k2 |
|---|---|
| 00 | 0 |
| 01 | 1 |
| 10 | 2 |
| 11 | 3 |

It has been found that the above three types of timing relationship sets are semi-statically or statically configured, and a minimum value in a timing relationship set determines the requirements of preparation operations of the UE before the UE receives the PDCCH. Since the UE does not know a value of a timing relationship before the UE receives the PDCCH, the UE needs to make a preparation according to the minimum value in the timing relationship set. For example, the smaller the minimum value in the timing relationship set is, the higher the preparation requirement is, the higher the processing strength requirement of the UE has, and the more power the UE consumes. On the other hand, the larger the minimum value in the timing relationship set is, the lower the preparation requirement is, the lower the processing strength requirement of the UE has, and the less power the UE consumes. However, in this case, a relatively small amount of data may be transmitted and the data transmission may have a relatively large delay. There is a need for a solution which can balance the resource consumption at the UE and requirements for the data transmission.

To this end, various example embodiments of the disclosure provide a method for determining a timing relationship. The method may be performed, for example, at a UE.

Figure 5:
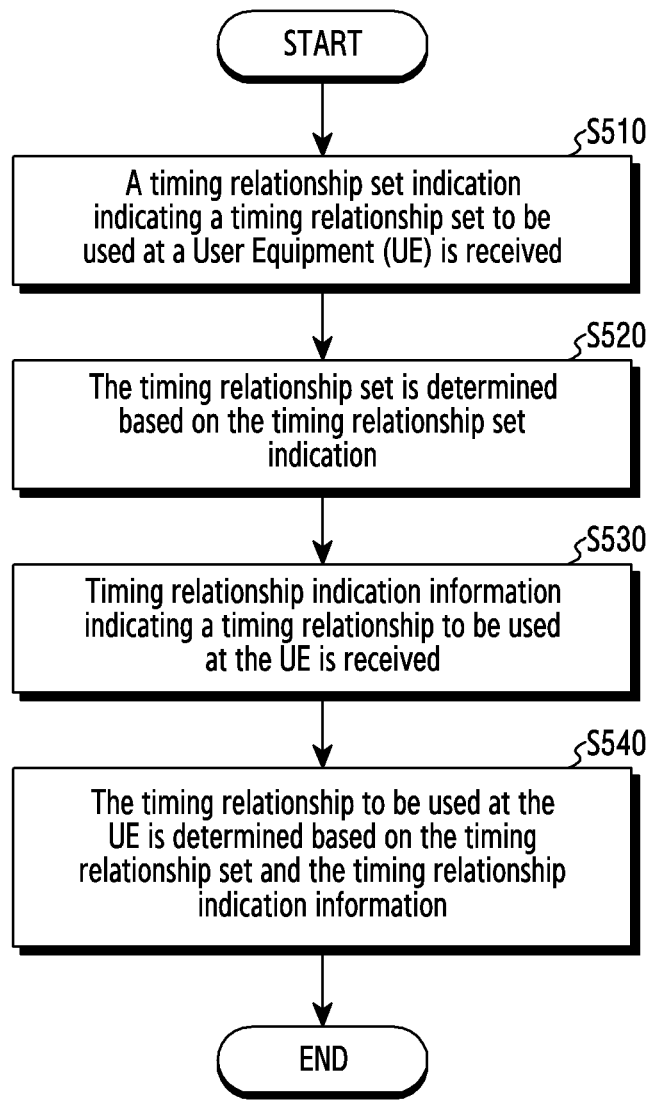
FIG. 5 is a flowchart illustrating an example method for determining a timing relationship according to an embodiment of the disclosure.

FIG. 5 is a flowchart illustrating an example method for determining a timing relationship according to an embodiment of the disclosure.

As shown, for example, in FIG. 1, the method may include the following operations.

In operation S510, a timing relationship set indication indicating a timing relationship set to be used at a UE is received.

In operation S520, the timing relationship set is determined based on the timing relationship set indication.

In operation S530, timing relationship indication information indicating a timing relationship to be used at the UE is received.

In operation S540, the timing relationship to be used at the UE is determined based on the timing relationship set and the timing relationship indication information.

In various example embodiments, the timing relationship set indication may include, for example, and without limitation, any of the following information:

a field related to the timing relationship set in a physical downlink control channel (PDCCH) which schedules a physical downlink shared channel (PDSCH);

a field related to the timing relationship set in a PDCCH which does not schedule a PDSCH;

a reference signal;

other control information which needs to be dynamically changed;

information transmitted with the other control information which needs to be dynamically changed;

constraints on a set comprising the timing relationship set.

In various example embodiments, the determined timing relationship set indicates that a change of a timing relationship set has occurred. In this example, determining the timing relationship to be used at the UE based on the timing relationship set and the timing relationship indication information may comprise:

determining, based on a change of a timing relationship set occurring within a predetermined time period, the timing relationship to be used at the UE based on the timing relationship set before the change and the timing relationship indication information, and preparing data transmission based on a minimum value in the timing relationship set before the change; and based on the predetermined time period elapsing, determining the timing relationship to be used at the UE based on the changed timing relationship set and the timing relationship indication information, and preparing data transmission based on a minimum value in the changed timing relationship set.

In various example embodiments, the determined timing relationship set indicates that a change of a timing relationship set has occurred. In this example, determining the timing relationship to be used at the UE based on the timing relationship set and the timing relationship indication information may comprise:

determining the timing relationship to be used at the UE based on the changed timing relationship set and timing relationship indication information;

based on, within a predetermined time period after determining that a change of a timing relationship set has occurred, a value of the timing relationship indicated by the timing relationship indication information being less than a minimum value in the timing relationship set before the change, abandoning data transmission before the timing relationship indicated by the timing relationship indication information, and preparing data transmission based on a minimum value in the timing relationship set before the change; and based on the predetermined time period after determining that the change of the timing relationship set has occurred elapsing, preparing data transmission based on a minimum value in the changed timing relationship set.

In various example embodiments, the timing relationship in the timing relationship set may indicate, for example, and without limitation, any of:

a timing relationship between the PDCCH and the PDSCH to be scheduled by the PDCCH, a timing relationship between the PDSCH and a hybrid automatic repeat request acknowledgement thereof;

a timing relationship between the PDCCH and a Physical Uplink Shared Channel (PUSCH) to be scheduled by the PDCCH.

In various example embodiments, based on the timing relationship set comprising a plurality of different types of timing relationship sets, the plurality of different types of timing relationship sets may be indicated respectively or indicated jointly.

To this end, the various example embodiments of the disclosure provide a UE for determining a timing relationship.

Figure 6:
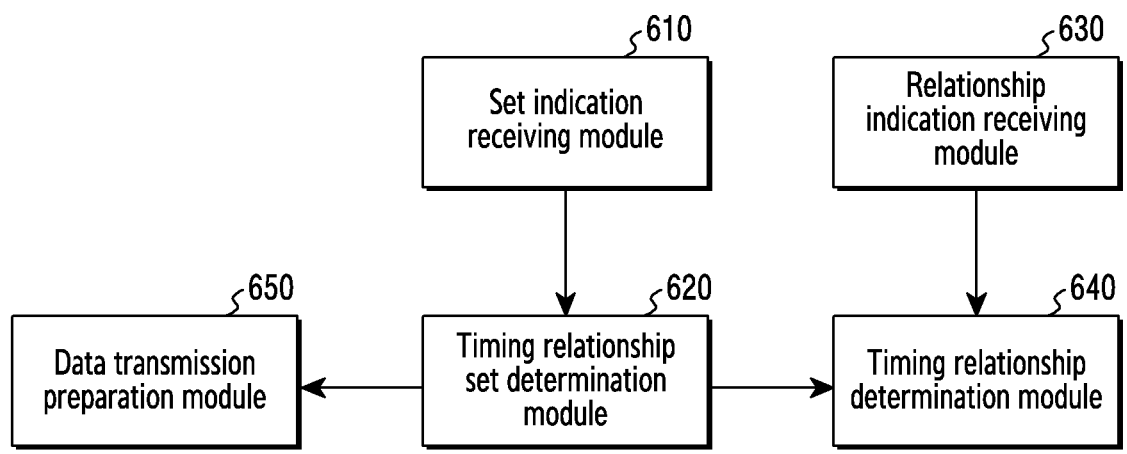
FIG. 6 is a block diagram illustrating example User Equipment (UE) according to an embodiment of the disclosure.

FIG. 6 is a block diagram illustrating an example UE according to an embodiment of the disclosure. As shown in FIG. 6, the UE comprises a set indication receiving module (e.g., including processing circuitry and/or executable program elements) 610, a timing relationship set determination module (e.g., including processing circuitry and/or executable program elements) 620, a relationship indication receiving module (e.g., including processing circuitry and/or executable program elements) 630 and a timing relationship determination module (e.g., including processing circuitry and/or executable program elements) 640.

The set indication receiving module 610 may include various processing circuitry and/or executable program elements and may be configured to receive a timing relationship set indication indicating a timing relationship set to be used at the UE.

The timing relationship set determination module 620 may include various processing circuitry and/or executable program elements and may be configured to determine the timing relationship set according to the timing relationship set indication.

The relationship indication receiving module 630 may include various processing circuitry and/or executable program elements and may be configured to receive timing relationship indication information indicating a timing relationship to be used at the UE.

The timing relationship determination module 640 may include various processing circuitry and/or executable program elements and may be configured to determine the timing relationship to be used at the UE based on the timing relationship set and the timing relationship indication information.

In various example embodiments, the timing relationship set indication may include, for example, and without limitation, any of the following information:

a field related to the timing relationship set in a PDCCH which schedules a PDSCH;

a field related to the timing relationship set in a PDCCH which does not schedule a PDSCH;

a reference signal;

other control information which needs to be dynamically changed;

information transmitted with the other control information which needs to be dynamically changed;

constraints on a set comprising the timing relationship set.

In various example embodiments, the determined timing relationship set indicates that a change of a timing relationship set has occurred. The device may further include a data transmission preparation module (e.g., including processing circuitry and/or executable program elements) 650. In this case, the timing relationship determination module 640 may be configured to determine, within a predetermined time period after determining that a change of a timing relationship set has occurred, the timing relationship to be used at the UE based on the timing relationship set before the change and the timing relationship indication information, and the data transmission preparation module 650 may be configured to prepare data transmission based on a minimum value in the timing relationship set before the change. The timing relationship determination module 640 may be further configured to, after the predetermined time period elapses, determine the timing relationship to be used at the UE based on the changed timing relationship set and the timing relationship indication information, and the data transmission preparation module 650 may be further configured to prepare data transmission based on a minimum value in the changed timing relationship set.

In various example embodiments, the determined timing relationship set indicates that a change of a timing relationship set has occurred. In this case, the timing relationship determination module 640 may be configured to determine the timing relationship to be used at the UE based on the changed timing relationship set and timing relationship indication information. If, within a predetermined time period after determining that a change of a timing relationship set has occurred, a value of the timing relationship indicated by the timing relationship indication information is less than a minimum value in the timing relationship set before the change, the data transmission preparation module 650 may further be configured to abandon data transmission before the timing relationship indicated by the timing relationship indication information, and prepare data transmission based on a minimum value in the timing relationship set before the change; and when the predetermined time period after determining that the change of the timing relationship set has occurred elapses, prepare data transmission based on a minimum value in the changed timing relationship set.

In various example embodiments, the timing relationship in the timing relationship set may indicate, for example, and without limitation, any of:

a timing relationship between the PDCCH and the PDSCH to be scheduled by the PDCCH, a timing relationship between the PDSCH and a hybrid automatic repeat request acknowledgement thereof;

a timing relationship between the PDCCH and a Physical Uplink Shared Channel (PUSCH) to be scheduled by the PDCCH.

In various example embodiments, when the timing relationship set comprises a plurality of different types of timing relationship sets, the plurality of different types of timing relationship sets may be indicated respectively or indicated jointly.

The example embodiments of the disclosure further propose a method for determining a timing relationship. The method may be performed at a base station or at other devices on a network side.

Figure 7:
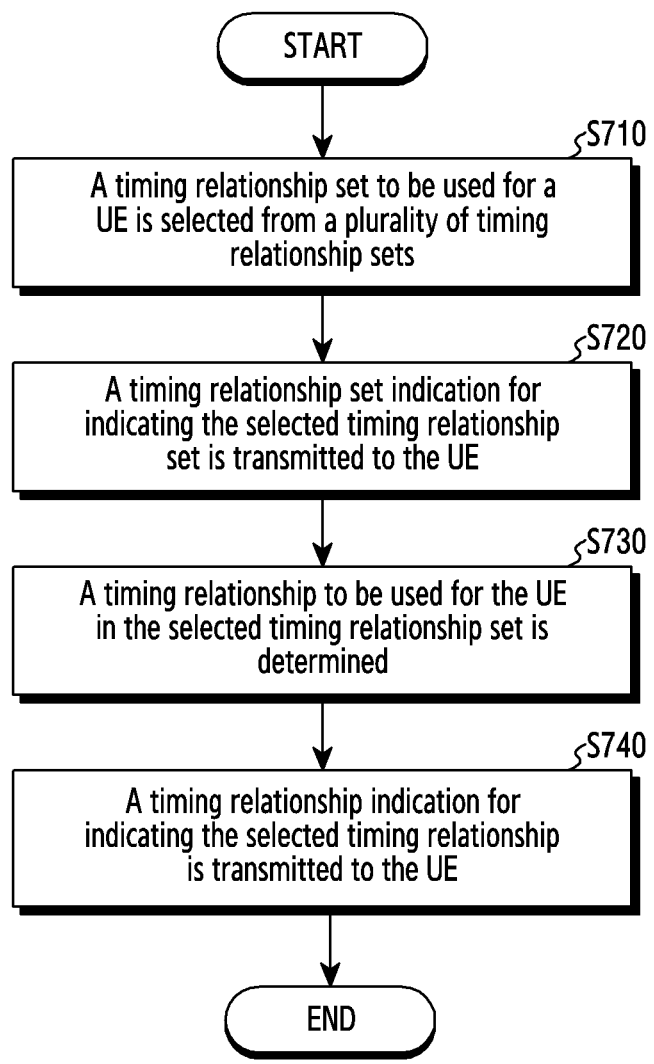
FIG. 7 is a flowchart illustrating another example method for determining a timing relationship according to an embodiment of the disclosure.

FIG. 7 is a flowchart illustrating another example method for determining a timing relationship according to an embodiment of the disclosure. As shown in FIG. 7, the method may include, for example, and without limitation the following operations.

In operation S710, a timing relationship set to be used for a UE is selected from a plurality of timing relationship sets.

In operation S720, a timing relationship set indication indicating the selected timing relationship set is transmitted to the UE.

In operation S730, a timing relationship to be used for the UE in the selected timing relationship set is determined.

In operation S740, a timing relationship indication indicating the selected timing relationship is transmitted to the UE.

In various example embodiments, selecting a timing relationship set to be used for a UE from a plurality of timing relationship sets may include, for example, and without limitation, selecting a timing relationship set to be used for the UE in the plurality of timing relationship sets according to data transmission of the UE, or may include, for example, and without limitation, selecting a timing relationship set to be used for the UE in the plurality of timing relationship sets according to data transmission of the UE. For example, the timing relationship set to be used for the UE may be determined according to a size of an amount of data to be transmitted by the UE and requirements for delay of data transmission. In various examples, when a small amount of data is to be transmitted and there are low requirements for the delay of the data transmission, a timing relationship set with a large value may be selected; and when a large amount of data is to be transmitted and there are high requirements for the delay of the data transmission, a timing relationship set with a small value may be selected. The technical solutions according to the embodiments of the disclosure are not limited thereto, other rules related to the size of the amount of data and the requirements for delay of data transmission are also possible, and even other indexes related to the data transmission may also be used, as long as the indexes may affect consumption of resources (such as power) at the UE.

In various example embodiments, determining a timing relationship to be used for the UE in the selected timing relationship set may comprise: if the selected timing relationship set is different from a timing relationship set previously selected for the UE, selecting, within a predetermined time period, from the selected timing relationship set, a timing relationship having a value not less than a minimum value in the timing relationship set previously selected for the UE, to be used for the UE. It should be understood that the timing relationship may also be determined according to other rules, and the technical solutions according to the disclosure are not limited by specific implementations of selection of the timing relationship.

The various example embodiments of the disclosure may further provide a device for determining a timing relationship. The device may be a base station, but may also be any other devices on a network side or parts thereof which realize the same functions.

Figure 8:
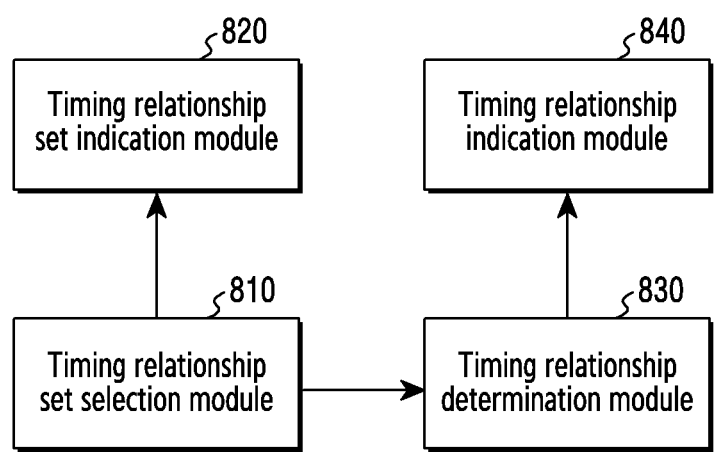
FIG. 8 is a block diagram illustrating an example base station according to an embodiment of the disclosure.

FIG. 8 is a block diagram illustrating an example base station according to an embodiment of the disclosure. As shown in FIG. 8, the base station comprises a timing relationship set selection module (e.g., including processing circuitry and/or executable program elements) 810, a timing relationship set indication module (e.g., including processing circuitry and/or executable program elements) 820, a timing relationship determination module (e.g., including processing circuitry and/or executable program elements) 830 and a timing relationship indication module (e.g., including processing circuitry and/or executable program elements) 840.

The timing relationship set selection module 810 may include various processing circuitry and/or executable program elements configured to select a timing relationship set to be used for a UE from a plurality of timing relationship sets.

The timing relationship set indication module 820 may include various processing circuitry and/or executable program elements configured to transmit indication information for indicating the selected timing relationship set to the UE.

The timing relationship determination module 830 may include various processing circuitry and/or executable program elements configured to determine a timing relationship to be used for the UE in the selected timing relationship set.

The timing relationship indication module 840 may include various processing circuitry and/or executable program elements configured to transmit indication information for indicating the selected timing relationship to the UE.

In various example embodiments, the timing relationship set selection module 810 may further be configured to select a timing relationship set to be used for the UE in the plurality of timing relationship sets based on data transmission of the UE. For example, the timing relationship set to be used for the UE may be determined based on a size of an amount of data to be transmitted by the UE and requirements for delay of data transmission. In various examples, when a small amount of data is to be transmitted and there are low requirements for the delay of the data transmission, a timing relationship set with a large value may be selected; and when a large amount of data is to be transmitted and there are high requirements for the delay of the data transmission, a timing relationship set with a small value may be selected. The technical solutions according to the embodiments of the disclosure are not limited thereto, other rules related to the size of the amount of data and the requirements for delay of data transmission are also possible, and even other indexes related to the data transmission may also be used, as long as the indexes may affect consumption of resources (such as power) at the UE.

In various example embodiments, the timing relationship determination module 830 may further be configured to, if the selected timing relationship set is different from a timing relationship set previously selected for the UE, select, within a predetermined time period, from the selected timing relationship set, a timing relationship having a value not less than a minimum value in the timing relationship set previously selected for the UE, to be used for the UE.

The technical solutions according to the disclosure will be described in greater detail below with reference to various examples. It is to be understood that the following example implementations are merely examples for implementing the technical solutions according to the disclosure, and should not be understood as limiting the technical solutions according to the disclosure.

When a PDCCH-to-PDSCH timing relationship, a PDSCH-to-HARQ-ACK timing relationship, and/or a PDCCH-to-PUSCH timing relationship are determined according to a timing relationship indicated by a timing relationship field, a timing relationship set may be changed according to a size of an amount of data to be transmitted and requirements for delay of data transmission. When a small amount of data is to be transmitted and there are low requirements for the delay of the data transmission, a value in the timing relationship set may be increased, and when a large amount of data is to be transmitted and there are high requirements for the delay of the data transmission, the value in the timing relationship set may be reduced. This can reduce power consumption on a UE side, while meeting the amount of data to be transmitted and the requirements for the delay of the data transmission.

Figure 9:
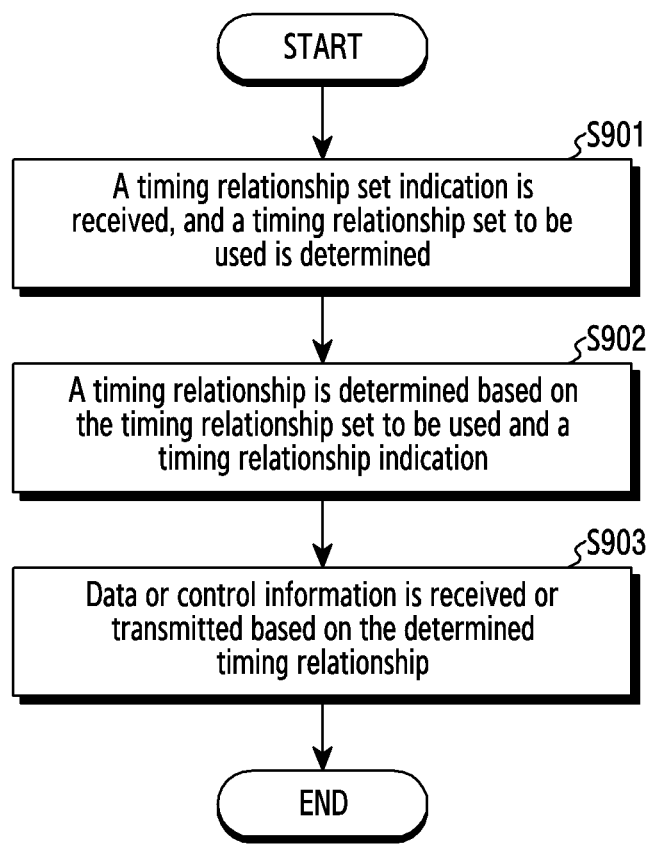
FIG. 9 is a flowchart illustrating an example method for changing a timing relationship set according to an embodiment of the present disclosure.

FIG. 9, is a flowchart illustrating an example method for dynamically changing a timing relationship set according to the disclosure. The example method illustrated in FIG. 9 may include the following operations.

In operation S901, a timing relationship set indication may be received, and a timing relationship set to be used may be determined.

In operation S902, a timing relationship may be determined based on the timing relationship set to be used and a timing relationship indication.

In operation S903, data or control information may be received or transmitted based on the determined timing relationship.

In the disclosure, the change of the timing relationship set comprises a method or dynamically changing at least one of a PDCCH-to-PDSCH timing relationship set, a PDSCH-to-HARQ-ACK timing relationship set, and a PDCCH-to-PUSCH timing relationship set.

Based on the method for dynamically changing a timing relationship set according to the disclosure described above, the method will be set forth in greater detail below.

A method for dynamically changing the PDCCH-to-PDSCH timing relationship set is described, and the PDCCH-to-PDSCH timing relationship set may be indicated by a field in the PDCCH which schedules the PDSCH. The PDCCH-to-PDSCH timing relationship set may be indicated by a field in the PDCCH which does not schedule the PDSCH, for example, there may be a special PDCCH which indicates the change of the PDCCH-to-PDSCH timing relationship set. The change of the PDCCH-to-PDSCH timing relationship set may also be indicated by a reference signal. The change of the PDCCH-to-PDSCH timing relationship set may be indicated jointly with other parameters (for example, parameters such as a monitoring period of the PDCCH, a monitoring bandwidth of the PDCCH, a control resource set, etc.) which need to be dynamically changed. For example, the change of the PDCCH-to-PDSCH timing relationship set and the change of the monitoring period of the PDCCH may be jointly indicated. The PDCCH-to-PDSCH timing relationship set may be changed with the monitoring period of the PDCCH, for example, when the monitoring period of the PDCCH is changed from p1 to p2, the PDCCH-to-PDSCH timing relationship set is changed from s1 to s2. The PDCCH-to-PDSCH timing relationship set may be indicated by applying constraints on the PDCCH-to-PDSCH timing relationship set. The change of the PDCCH-to-PDSCH timing relationship set may be realized by applying different constraints on a PDCCH-to-PDSCH timing relationship set. For example, a set s1 comprises {a1, a2, a3, A4, a5, a6, a7, a8}, a set s2 comprises {a3, a4, a5, a6, a7, a8, a9, a10}, and the set s1 and the set s2 may be regarded as results obtained by applying different constraints on a set s{a1, a2, a3, a4, a5, a6, a7, a8, a9, a10}. Therefore, the change from the set s1 to the set s2 may be considered as a change of one constrained set of the sets to another constrained set of the set s. The constrained set may be a new set formed by disabling some elements in one set. For example, the set s1 may be considered as a set obtained by disabling ninth and tenth elements in the set s, and the set s2 may be considered as a set obtained by disabling first and second elements in the set s. The disclosure will be described in greater detail below by taking the change of the timing relationship set as an example, and may also be applicable to a case of applying constraints on the timing relationship set.

The disclosure will be described in greater detail below by taking the change of the PDCCH-to-PDSCH timing relationship set being indicated by the PDCCH as an example. A plurality of PDCCH-to-PDSCH timing relationship sets may be configured using high-layer signaling, and then an indication information field in the PDCCH may be used to indicate one of the plurality of PDCCH-to-PDSCH timing relationship sets which may be configured using the high-layer signaling. For example, two PDCCH-to-PDSCH timing relationship sets may be configured using high-layer signaling, wherein a first one of the two sets is {0, 1, 2, 3}, and a second one of the two sets is {2, 3, 4, 5}. 1-bit information in the PDCCH is used to indicate whether the first set or the second set is used, for example, when an indication value is "0", the first set is used, and when the indication value is "1", the second set is used.

Figure 10:
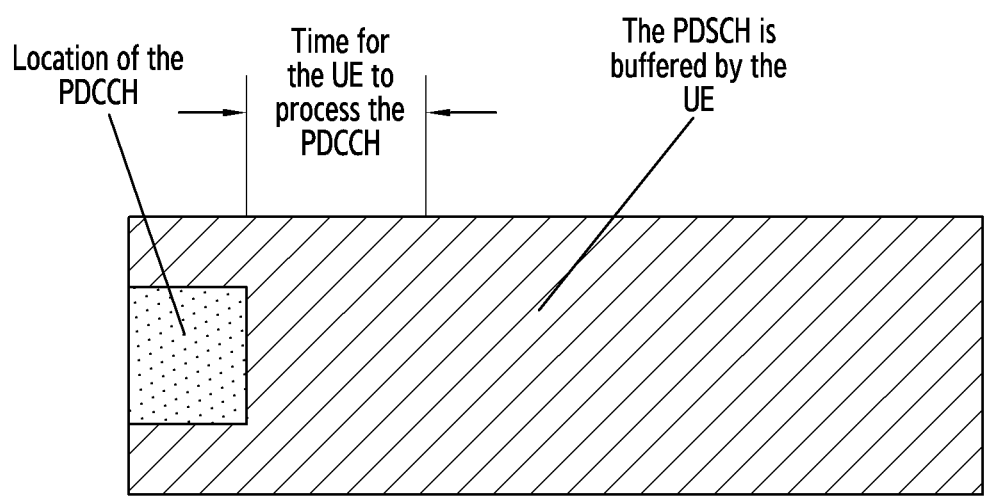
FIG. 10 is a diagram illustrating an example method for changing a timing relationship set according to an embodiment of the disclosure.

When the PDCCH-to-PDSCH timing relationship set to be used is the first set, a minimum value in the first set {0, 1, 2, 3} is {0}. A UE does not know which value in the first set is indicated before receiving the PDCCH which schedules the PDSCH. Therefore, the UE needs to make a preparation according to the minimum value of {0} in the timing relationship set. The PDCCH which schedules the PDSCH and the PDSCH are within one time unit. As shown in FIG. 10, the UE may need to buffer data signals on resources on which the PDSCH may be transmitted while receiving the PDCCH. Further, the PDCCH is required to be received rapidly, so that if the timing relationship indication information in the PDCCH indicates the value of {0}, the UE can receive the data in time.

Figure 11:
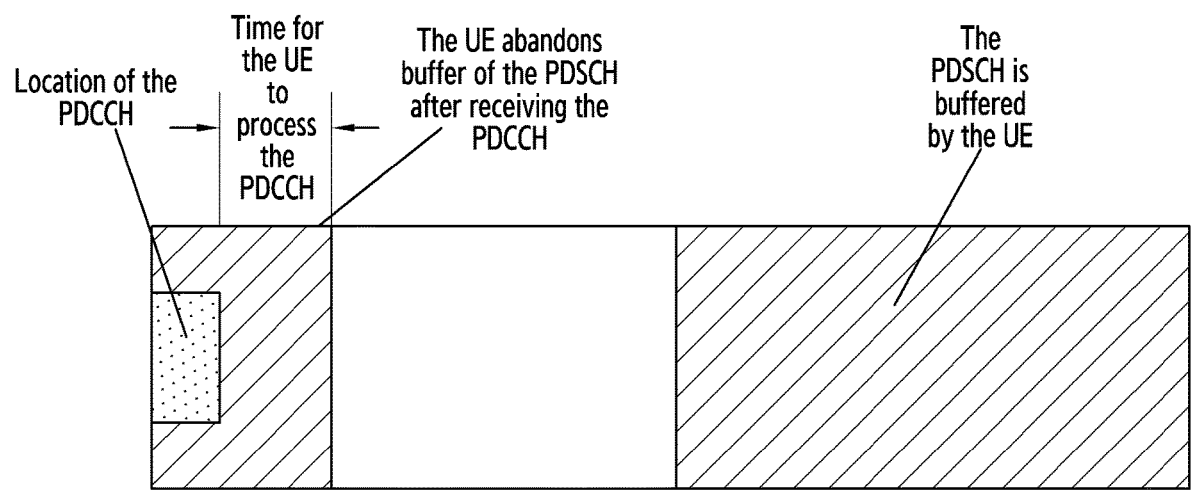
FIG. 11 is a diagram illustrating an example method for changing a timing relationship set according to an embodiment of the disclosure.

When the UE makes a preparation according to the minimum value of {0} in the timing relationship set, and an actual value indicated by the timing relationship indication information in the PDCCH is greater than {0}, for example, is equal to 1, the UE may abandon the data buffer in the same time unit as that of the PDCCH, and may buffer data in a next time unit. In this way, the UE can receive the data in time, as shown in FIG. 11.

Figure 12:
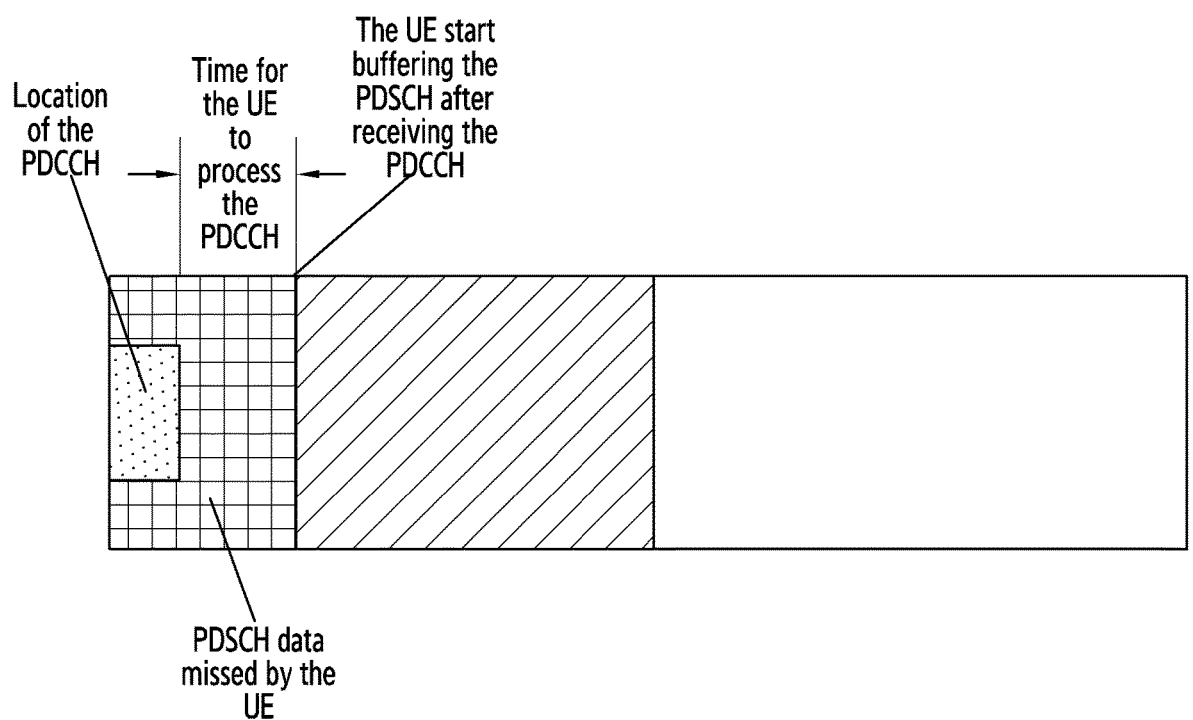
FIG. 12 is a diagram illustrating an example method for changing a timing relationship set according to an embodiment of the disclosure.
Figure 13:
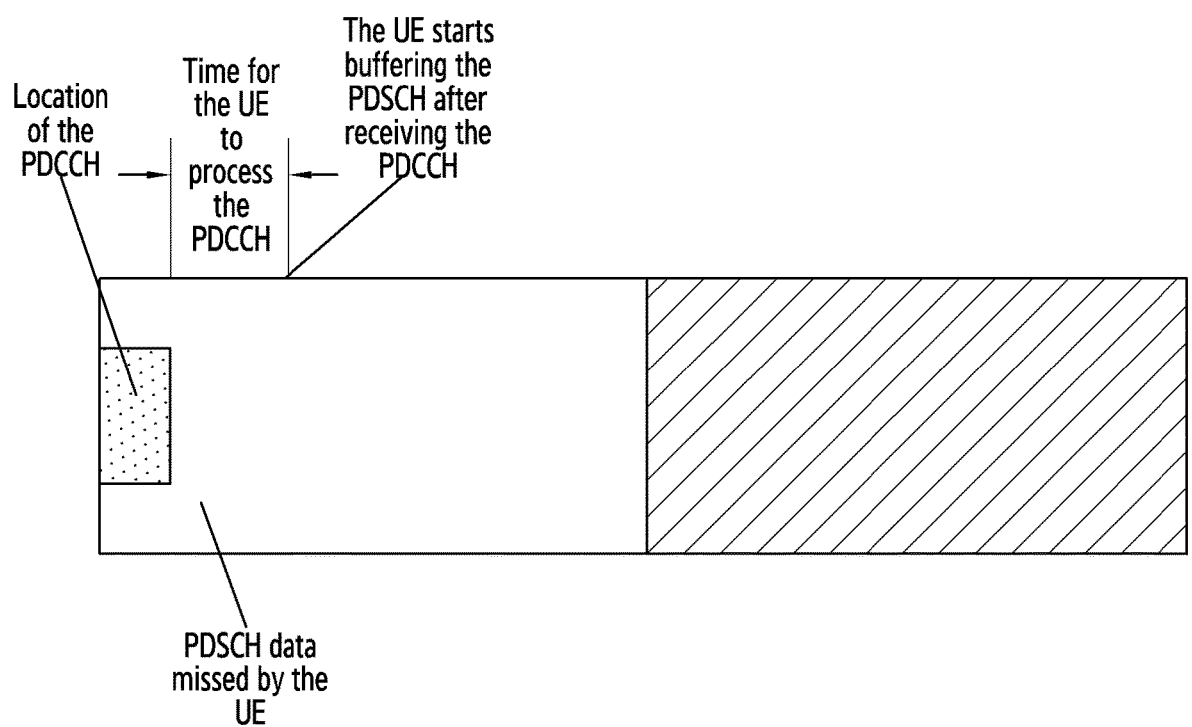
FIG. 13 is a diagram illustrating an example method for changing a timing relationship set according to an embodiment of the disclosure.

When the UE does not make a preparation according to the minimum value of {0} in the timing relationship set, for example, the UE makes a preparation according to a value of {1} in the timing relationship set, the UE prepares to buffer data in a next time unit. For example, the UE does not buffer data within the same time unit as that of the PDCCH before receiving the PDCCH. If it is found, after the UE receives the PDCCH, that the actual value indicated by the timing relationship indication information in the PDCCH is {0}, and then the UE starts buffering data, there may be certain data which has been missed, and the UE cannot receive the data in time, as shown in FIG. 12. When the UE does not make a preparation according to the minimum value of {0} in the timing relationship set, for example, the UE makes a preparation according to the value of {1} in the timing relationship set, the UE prepares to buffer data in a next time unit. For example, the UE does not buffer data within the same time unit as that of the PDCCH before receiving the PDCCH. If it is found, after the UE receives the PDCCH, that the actual value indicated by the timing relationship indication information in the PDCCH is {1}, and then the UE starts buffering data in the next time unit of the PDCCH, the UE may receive the data in time, as shown in FIG. 13. Therefore, if the UE does not make a preparation according to the minimum value in the timing relationship set, the UE may sometimes receive the data in time, and may sometimes not receive the data in time. For the purpose of enabling the UE to receive the data in time in all cases, the UE needs to make a preparation according to the minimum value in the timing relationship set.

When the PDCCH-to-PDSCH timing relationship set is dynamically changed, if a minimum value in the changed PDCCH-to-PDSCH timing relationship set is greater than or equal to a minimum value in the PDCCH-to-PDSCH timing relationship set before the change, the UE makes a preparation according to the minimum value in the PDCCH-to-PDSCH timing relationship set before the change. Since the minimum value in the PDCCH-to-PDSCH timing relationship set before the change is less than or equal to the minimum value in the changed PDCCH-to-PDSCH timing relationship set, the UE can receive the data in time. For example, two PDCCH-to-PDSCH timing relationship sets may be configured using high-layer signaling, wherein a first one of the two sets is {0, 1, 2, 3}, and a second one of the two sets is {2, 3, 4, 5}. When the timing relationship set is changed from the first set to the second set, the UE makes a preparation according to a minimum value of 0 in the first set. Since all values in the second set are greater than 0, the UE can receive the data in time.

When the minimum value in the changed PDCCH-to-PDSCH timing relationship set is less than the minimum value in the PDCCH-to-PDSCH timing relationship set before the change, the UE makes a preparation according to the minimum value in the PDCCH-to-PDSCH timing relationship set before the change. Since the minimum value in the PDCCH-to-PDSCH timing relationship set before the change is greater than the minimum value in the changed PDCCH-to-PDSCH timing relationship set, the UE may not receive the data in time. For example, two PDCCH-to-PDSCH timing relationship sets may be configured using high-layer signaling, wherein a first one of the two sets is {0, 1, 2, 3}, and a second one of the two sets is {2, 3, 4, 5}. When the timing relationship set is changed from the second set to the first set, if the UE makes a preparation according to a minimum value of 2 in the PDCCH-to-PDSCH timing relationship set before the change, e.g., the second set, but an actual value indicated by the timing relationship indication information in the PDCCH is 0 or 1, the UE may not buffer the data in time, and therefore the UE may not receive the data in time.

For the problems existing in the change of the PDCCH-to-PDSCH timing relationship set described above, the following several processing methods may be used.

First Example

Figure 14:
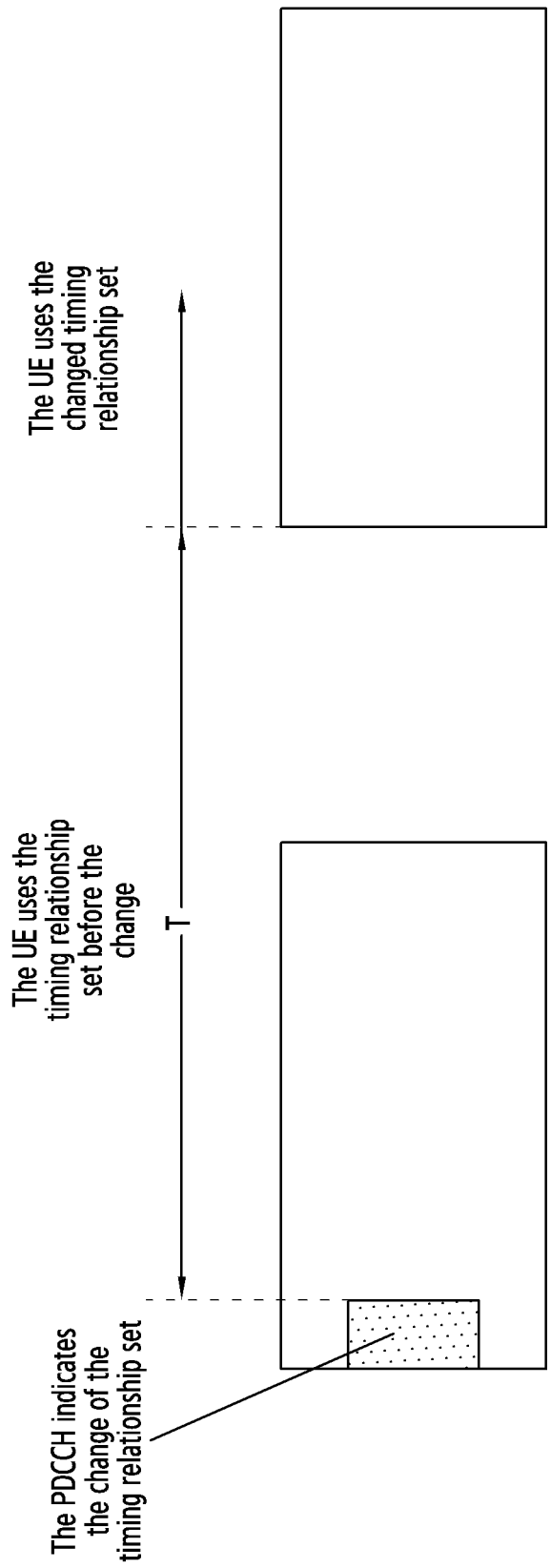
FIG. 14 is a diagram illustrating an example method for changing a timing relationship set according to an embodiment of the present disclosure.

If a PDCCH-to-PDSCH timing relationship set indicated by timing relationship set indication information received by the UE is different from a current PDCCH-to-PDSCH timing relationship set, for example, the PDCCH-to-PDSCH timing relationship set is to be changed, at this time, within a time period T after the end of the UE receiving the PDCCH which indicates the change of the PDCCH-to-PDSCH timing relationship set (for example, a time period from the end of the UE receiving the PDCCH which indicates the change of the PDCCH-to-PDSCH timing relationship set to the start of a next monitoring occasion of the PDCCH or a processing delay of the PDCCH), the UE still determines the PDCCH-to-PDSCH timing relationship according to the PDCCH-to-PDSCH timing relationship set before the change and the timing relationship indication information in the PDCCH, and after the time period T elapses, the UE determines the PDCCH-to-PDSCH timing relationship according to the changed PDCCH-to-PDSCH timing relationship set and the timing relationship indication information in the PDCCH, as shown in FIG. 14. For example, two PDCCH-to-PDSCH timing relationship sets may be configured using high-layer signaling, wherein a first one of the two sets is {0, 1, 2, 3}, and a second one of the two sets is {2, 3, 4, 5}. The timing relationship set before a time slot n is the first set, and in the time slot n, the timing relationship set indication information in the PDCCH indicates the second timing relationship set. The timing relationship set has been changed to the second set. However, the timing relationship in the PDCCH which schedules the PDSCH in the time slot n is still determined according to the first timing relationship set. For example, when a timing relationship indication information value in the PDCCH which schedules the PDSCH is 01, according to the mapping relationship between the timing relationship indication information values and the timing relationships shown in Table 1, the timing relationship is 1. For example, the UE needs to receive the PDSCH in a time slot n+1. With this method, since the UE still uses the timing relationship set before the change within a certain time after the UE receives the indication of the change of the timing relationship set, if the UE prepares to receive data according to a minimum value in the timing relationship set before the change, the UE can receive the data in time.

Figure 15:
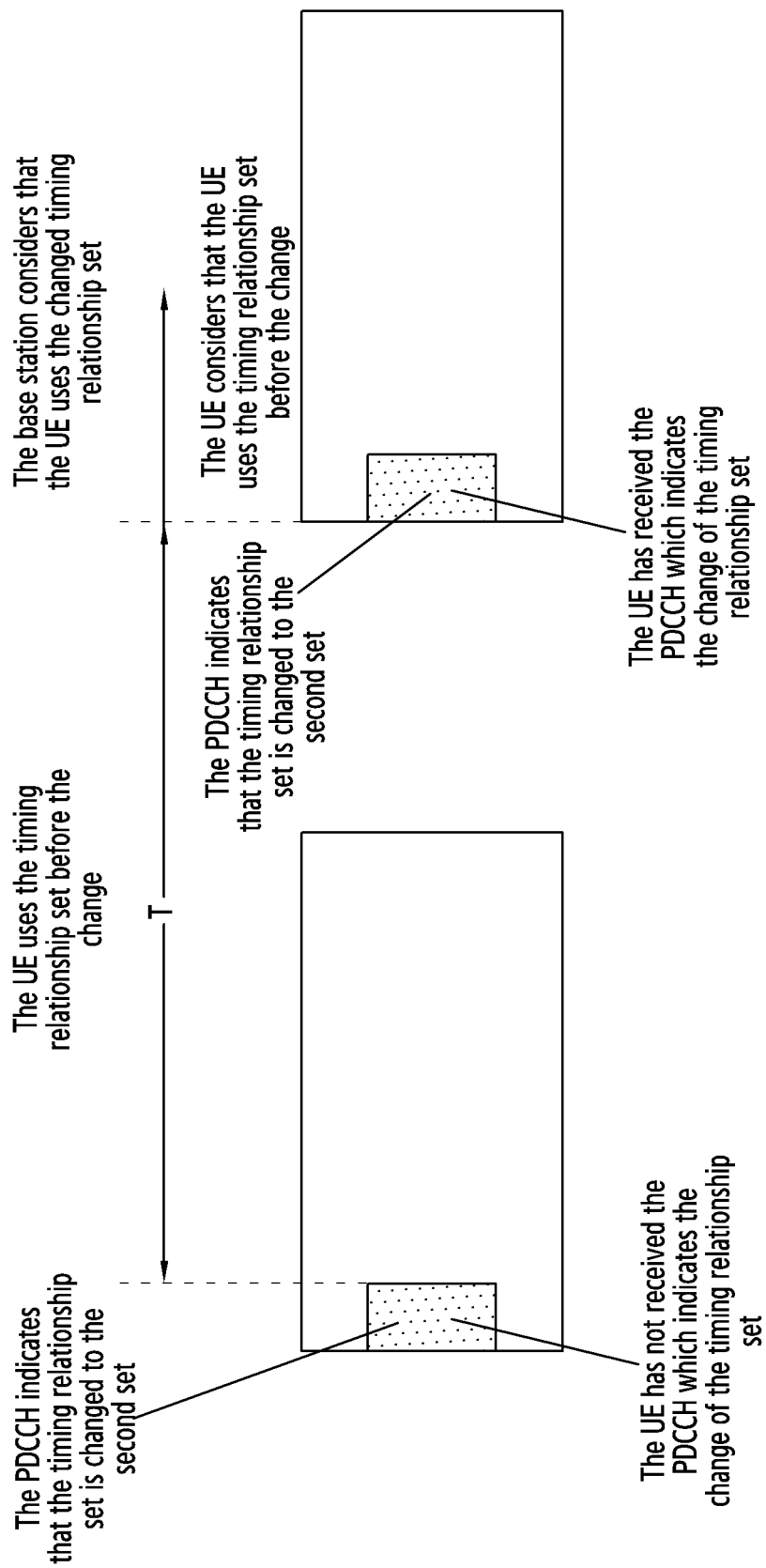
FIG. 15 is a diagram illustrating an example method for changing a timing relationship set according to an embodiment of the disclosure.

However, with this method, if the UE misses the PDCCH which indicates the change of the timing relationship set, the UE and a base station may have different understandings of the timing relationship set to be used. For example, two PDCCH-to-PDSCH timing relationship sets may be configured using high-layer signaling, wherein a first one of the two sets is {0, 1, 2, 3}, and a second one of the two sets is {2, 3, 4, 5}. Before a time slot n, the timing relationship set is the first set, and in the time slot n, the timing relationship set indication information in the PDCCH indicates the second timing relationship set. The base station considers that in the time slot n, the timing relationship set is changed to the second timing relationship set. In the time slot n, the UE does not receive the PDCCH which indicates that the timing relationship set is changed to the second set, and the UE considers that in the time slot n, the timing relationship set is still the first timing relationship set. In time slots n to n+T, the UE does not receive the PDCCH, and in the time slot n+T+1, the UE receives the timing relationship set indication information in the PDCCH which indicates the second timing relationship set, and the UE considers that this is the first time that the UE receives an indication indicating the change of the timing relationship set. In the time slot n+T+1, the UE determines the PDCCH-to-PDSCH timing relationship according to the timing relationship set before the change. However, the base station considers that the UE has received the timing relationship set indication information in the PDCCH which indicates the second timing relationship set in the time slot n, and the UE should determine the PDCCH-to-PDSCH timing relationship according to the changed timing relationship set (the second timing relationship set) in the time slot n+T+1. Therefore, the UE and the base station have different understandings of the time slot in which the PDSCH is received, as shown in FIG. 15.

Second Example

Figure 16:
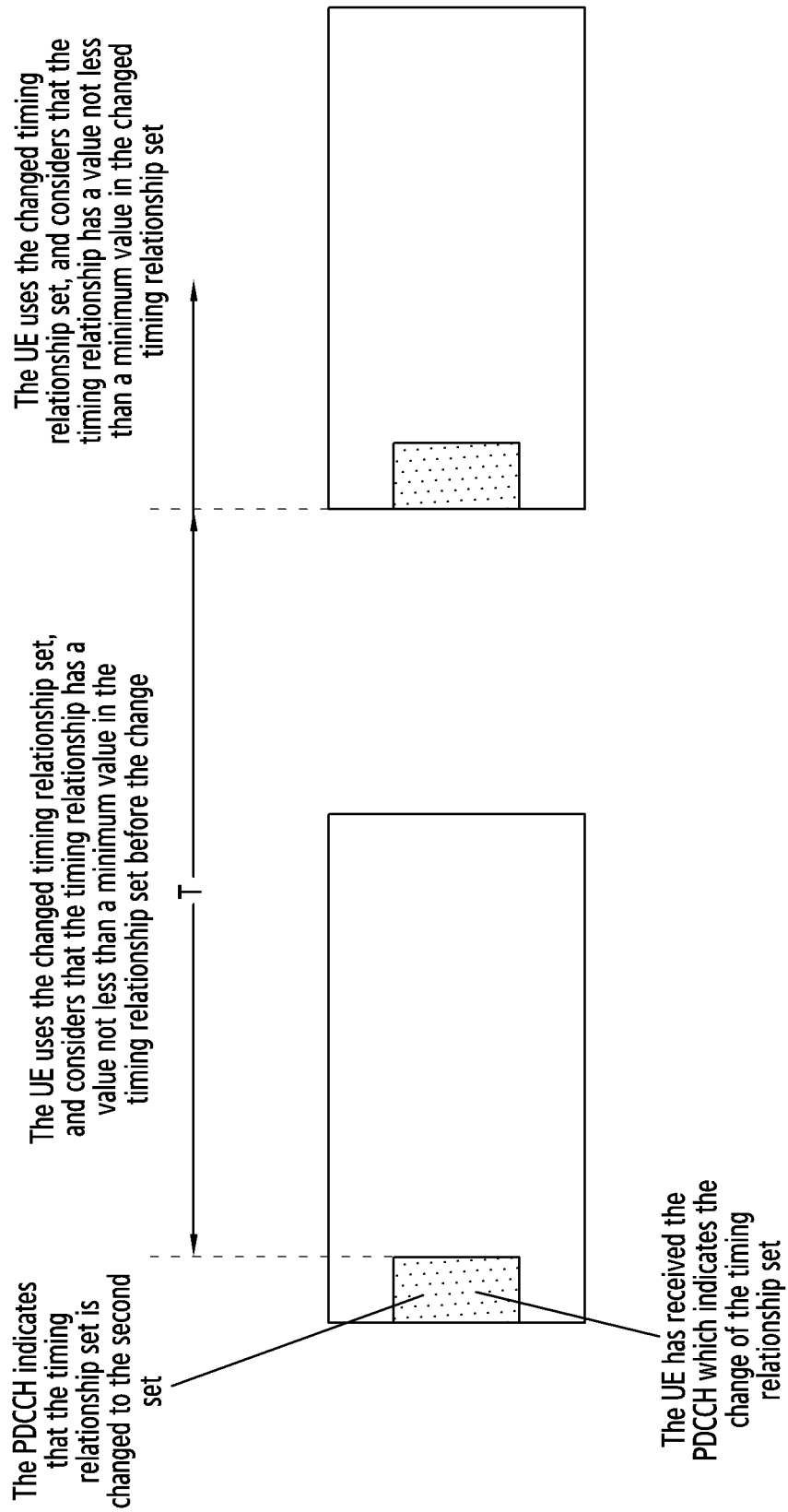
FIG. 16 is a diagram illustrating an example method for changing a timing relationship set according to an embodiment of the disclosure.

If a PDCCH-to-PDSCH timing relationship set indicated by timing relationship set indication information received by the UE is different from a current PDCCH-to-PDSCH timing relationship set, for example, the PDCCH-to-PDSCH timing relationship set is to be changed, the UE determines the PDCCH-to-PDSCH timing relationship according to the changed PDCCH-to-PDSCH timing relationship set and timing relationship indication information in the PDCCH, and the UE prepares to receive data according to a minimum value in the timing relationship set before the change. In order to ensure that if the UE makes a preparation according to the minimum value in the timing relationship set before the change, the UE may receive the data in time, within a time period T after the end of the UE receiving the PDCCH which indicates the change of the PDCCH-to-PDSCH timing relationship set (for example, a time period from the end of the UE receiving the PDCCH which indicates the change of the PDCCH-to-PDSCH timing relationship set to the start of a next monitoring occasion of the PDCCH), the UE considers that a timing relationship value indicated by the timing relationship indication information in the PDCCH which schedules the PDSCH transmitted by a base station is not less than a minimum value in the timing relationship set before the change. The UE does not desire to receive the timing relationship indication information in the PDCCH which schedules the PDSCH transmitted by the base station, which indicates a timing relationship value less than the minimum value in the timing relationship set before the change, so that the UE can receive the data in time. After the time period T elapses, the UE considers that even if the timing relationship value indicated by the timing relationship indication information in the PDCCH which schedules the PDSCH transmitted by the base station is less than the minimum value in the timing relationship set before the change, there is no problem as long as the timing relationship value indicated by the timing relationship indication information in the PDCCH which schedules the PDSCH transmitted by the base station is not less than a minimum value in the changed timing relationship set, as shown in FIG. 16. With this method, after the UE receives the indication of the change of the timing relationship set, the UE uses the changed timing relationship set, and with the implementation method at the base station, if the timing relationship value indicated by the timing relationship indication information in the PDCCH which schedules the PDSCH transmitted by the base station is not less than the minimum value in the timing relationship set before the change within a certain time, the UE can receive the data in time.

Figure 17:
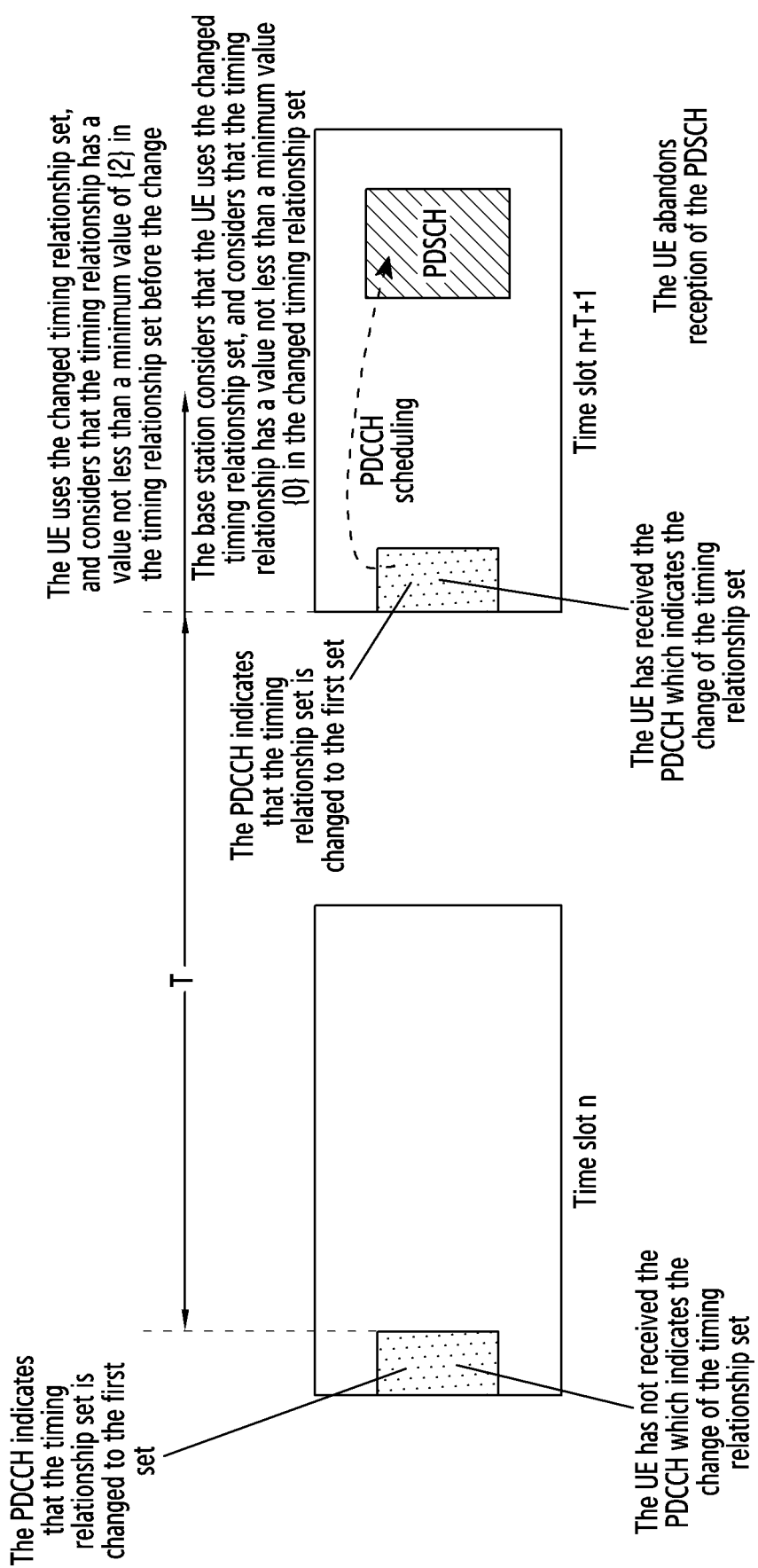
FIG. 17 is a diagram illustrating an example method for changing a timing relationship set according to an embodiment of the disclosure.

With this method, if the UE misses the PDCCH which indicates the change of the timing relationship set, within a time period T after the end of the UE receiving the PDCCH which indicates the change of the PDCCH-to-PDSCH timing relationship set (for example, a time period from the end of the UE receiving the PDCCH which indicates the change of the PDCCH-to-PDSCH timing relationship set to the start of a next monitoring occasion of the PDCCH), there may be a case that a timing relationship value indicated by the timing relationship indication information in the PDCCH which schedules the PDSCH transmitted by the base station is less than a minimum value in the timing relationship set before the change. This may be considered as an error case, and the UE only needs to abandon the reception of the PDSCH. For example, two PDCCH-to-PDSCH timing relationship sets may be configured using high-layer signaling, wherein a first one of the two sets is $\{0, 1, 2, 3\}$, and a second one of the two sets is $\{2, 3, 4, 5\}$. Before a time slot n, the timing relationship set is the second set, and in the time slot n, the timing relationship set indication information in the PDCCH indicates the first timing relationship set. The base station considers that in the time slot n, the timing relationship set is changed to the first timing relationship set. In the time slot n, the UE does not receive the PDCCH indicating that the timing relationship set is changed to the first set, and the UE considers that in the time slot n, the timing relationship set is still the second timing relationship set. In time slots n to n+T, the UE does not receive the PDCCH, and in a time slot n+T+1, the UE receives the timing relationship set indication information in the PDCCH which indicates the first timing relationship set, and the UE considers that this is the first time that the UE receives an indication indicating the change of the timing relationship set. in the time slot n+T+1, the UE determines a PDCCH-to-PDSCH timing relationship according to the changed timing relationship set, that is, determines the timing relationship according to the first timing relationship set, but the UE considers that the timing relationship value indicated by the timing relationship indication information in the PDCCH which schedules the PDSCH transmitted by the base station is not less than a minimum value of $\{2\}$ in the second timing relationship set before the change. However, the base station considers that, in the time slot n, the UE has received the timing relationship set indication information in the PDCCH which indicates the first timing relationship set, and in the time slot n+T+1, the timing relationship value indicated by the timing relationship indication information in the PDCCH which schedules PDSCH transmitted by the base station is $\{0\}$, which is allowable to be less than the minimum value of $\{2\}$ in the timing relationship set before the change at this time. Therefore, the timing relationship value indicated by the timing relationship indication information in the PDCCH which schedules the PDSCH transmitted by the base station is $\{0\}$. The UE considers that this is an error, and the UE only needs to abandon the PDSCH in the time slot n+T+1 which is scheduled by the PDCCH in the time slot n+T+1, as shown in FIG. 17.

The method for dynamically changing the timing relationship (k0) set from the PDCCH which schedules the PDSCH to the scheduled PDSCH is described above. A method for dynamically changing the timing relationship (k2) set from the PDCCH which schedules the PUSCH to the scheduled PUSCH and a method for dynamically changing the timing relationship (k1) set from the PDSCH to transmission of an HARQ-ACK generated by the PDSCH will be described in greater detail below.

The dynamic changes of the above three timing relationship sets may be respectively indicated by individual methods, or at least two of the three timing relationship sets described above are jointly indicated. For example, the timing relationship (k0) set from the PDCCH which schedules the PDSCH to the scheduled PDSCH and the timing relationship (k1) set from the PDSCH to transmission of an HARQ-ACK generated by the PDSCH are jointly indicated, as shown, for example, in Table 4. Table 4 exemplifies a mapping rule among indication field values, the timing relationship k0 from downlink assignment to downlink data and the timing relationship k1 from the PDSCH to transmission of an HARQ-ACK generated by the PDSCH.

TABLE 4

| Field indication value | k0 | k1 |
|---|---|---|
| 00 | 0 | 2 |
| 01 | 1 | 3 |
| 10 | 2 | 4 |
| 11 | 3 | 5 |

When the dynamic change of the timing relationship (k0) set between the PDCCH which schedules the PDSCH to the scheduled PDSCH is indicated by information in a PDCCH (e.g., a dedicated PDCCH) which does not schedule the PDSCH, this indication information may be missed by the UE. At this time, the base station considers that the changed timing relationship (denoted as k0-1) between the PDCCH which schedules the PDSCH and the scheduled PDSCH is used, and the UE considers that the unchanged timing relationship (denoted as k0-0) between the PDCCH which schedules the PDSCH and the scheduled PDSCH is used. At this time, regardless of how the timing relationship set changes, a number of bits of the timing relationship indication information in the PDCCH which schedules the PDSCH is unchanged (in addition, when the dynamic change of the timing relationship (k0) set between the PDCCH which schedules the PDSCH and the scheduled PDSCH is indicated by information in the PDCCH which schedules the PDSCH, in order to maintain a number of bits of a PDCCH format unchanged, a number of bits of the timing relationship indication information in the PDCCH which schedules the PDSCH is unchanged). The timing relationship indication information in the PDCCH which schedules the PDSCH may indicate a timing relationship set S before constraints are applied, for example, S comprises eight elements, which are {0, 1, 2, 3, 4, 5, 6, 7}, and the number of the bits of the timing relationship indication information may be 3. Different timing relationship sets may be obtained by differently applying constraints on the PDCCH-to-PDSCH timing relationship set. For example, the set S1 comprises {0, 1, 2, 3}, and the set S2 comprises {2, 3, 4, 5, 6}, as shown, for example, in Table 5. Table 5 exemplifies a mapping rule among timing relationship indication values and the timing relationship k0 from downlink assignment to downlink data.

TABLE 5

| Timing relationship indication value | k0 |
|---|---|
| 000 | 0 |
| 001 | 1 |
| 010 | 2 |
| 011 | 3 |
| 100 | 4 |
| 101 | 5 |
| 110 | 6 |
| 111 | 7 |

With the above method, if the UE misses the PDCCH which indicates the change of the timing relationship set, the base station and the UE may have different understandings of the correspondence between the timing relationship indication values and the timing relationship k0 from downlink assignment to downlink data.

When the UE misses the indication information which indicates the change of the timing relationship set, if the UE receives a timing relationship indication value (denoted as k0_1) in the PDCCH which schedules the PDSCH, which is less than a minimum value in the current timing relationship set, a minimum value in the timing relationship set becomes k0_1, and the UE prepares to receive data according to the minimum value k0_1 in the timing relationship set. For example, the current timing relationship set is {2, 3, 4, 5, 6}, and a minimum value in the timing relationship set is 2. When the UE receives a timing relationship value of {0} in the PDCCH which schedules the PDSCH, the minimum value in the timing relationship set becomes 0, and the UE prepares to receive data according to the minimum value of 0 in the timing relationship set.

When the UE is configured with more than one downlink BandWidth Part (BWP), an interval indicated by a minimum value in a timing relationship (k0) set configured for one BWP is not greater than an interval indicated by a maximum value in a timing relationship (k0) set configured for any BWP. In this way, it may be ensured that during switching of the BWP, the UE prepares to receive data according to a minimum value in the timing relationship (k0) set before the switching of the BWP, and when the UE receives the PDCCH which schedules the PDSCH and indicates the switching of the BWP, the UE may be able to receive the scheduled PDSCH on the switched BWP. Otherwise, the UE may not be able to receive the scheduled PDSCH on the switched BWP in time. For example, the timing relationship (k0) set before the switching of the BWP is {4, 5, 6, 7,}, and the timing relationship (k0) set after the switching of the BWP is {0, 1, 2, 3}. Thus, a minimum value of 4 in the timing relationship (k0) set before the switching of the BWP is greater than a maximum value of 3 in the timing relationship (k0) set after the switching of the BWP. If the UE schedules a PDSCH on a switched BWP on a PDCCH on a BWP which is not switched, there is a time interval of three slots between the PDCCH and the PDSCH to be scheduled by the PDCCH. The UE prepare to receive the PDSCH according to the minimum value of 4 in the timing relationship (k0) set before the switching of the BWP, and therefore may not be able to receive the PDSCH having an interval of three slots from the PDCCH in time.

If the dynamic change of the timing relationship (k0) set between the PDCCH which schedules the PDSCH and the scheduled PDSCH is indicated by information in the PDCCH (e.g., the dedicated PDCCH) which does not schedule the PDSCH, when the UE receives the dedicated PDCCH, the UE needs to feed back ACK information, wherein the dedicated PDCCH may comprise an HARQ timing relationship indication, which indicates a time interval from the dedicated PDCCH to transmission of the ACK, or the time interval from the dedicated PDCCH to transmission of the ACK is determined by a high layer signaling configuration.

The dedicated PDCCH may be transmitted according to a configured period. If the UE receives the dedicated PDCCH when the configured period arrives, the UE prepares to receive the PDSCH according to the minimum value of the indicated timing relationship set. If the UE does not receive the dedicated PDCCH when the configured period arrives, the UE prepares to receive the PDSCH according to a minimum value of a default timing relationship set, or prepares to receive the PDSCH according to a minimum value of a timing relationship set indicated by a dedicated PDCCH which is previously received.

When the above solution for dynamically changing the timing relationship (k0) set from the PDCCH which schedules the PDSCH to the scheduled PDSCH is applied to the dynamic change of the timing relationship (k2) set from the PDCCH which schedules the PUSCH to the scheduled PUSCH, only corresponding adjustments need to be performed. For example, the PDCCH which schedules the PDSCH is replaced with the PDCCH which schedules the PUSCH, the scheduled PDSCH is replaced with the scheduled PUSCH, the timing relationship (k0) from the PDCCH which schedules the PDSCH to the scheduled PDSCH is replaced with the timing relationship (k2) from the PDCCH which schedules the PUSCH to the scheduled PUSCH, and the timing relationship (k0) set from the PDCCH which schedules the PDSCH to the scheduled PDSCH is replaced with the timing relationship (k2) set from the PDCCH which schedules the PUSCH to the scheduled PUSCH.

When the above solution for dynamically changing the timing relationship (k0) set from the PDCCH which schedules the PDSCH to the scheduled PDSCH is applied to the dynamic change of the timing relationship (k1) set from the PDSCH to transmission of an HARQ-ACK generated by the PDSCH, only corresponding adjustments need to be performed. For example, the PDCCH which schedules the PDSCH is replaced with the PDSCH which generates the HARQ-ACK, the scheduled PDSCH is replaced with the HARQ-ACK generated by the PDSCH, the timing relationship (k0) from the PDCCH which schedules the PDSCH to the scheduled PDSCH is replaced with the timing relationship (k1) from the PDSCH to transmission of an HARQ-ACK generated by the PDSCH, and the timing relationship (k0) set from the PDCCH which schedules the PDSCH to the scheduled PDSCH is replaced with the timing relationship (k1) set from the PDSCH to transmission of an HARQ-ACK generated by the PDSCH.

In the disclosure, the timing relationship set is dynamically changed, the power consumption of the UE is saved, and the timely data transmission is ensured.

Figure 18:
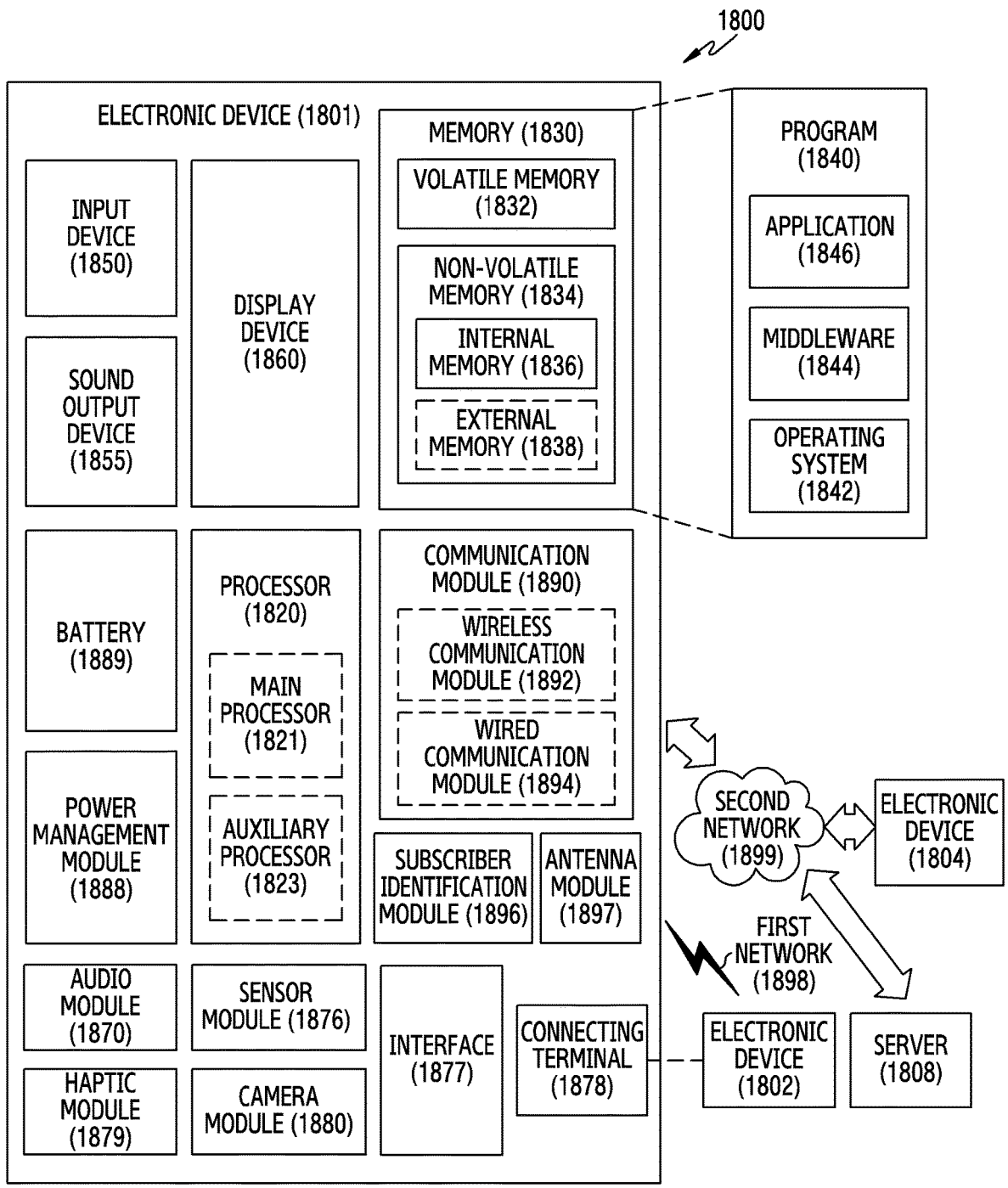
FIG. 18 is a block diagram illustrating an example electronic apparatus in a network environment according to various embodiments.

FIG. 18 is a block diagram illustrating an example electronic device 1801 in a network environment 1800 according to various embodiments. The electronic device 1801 may be the UE shown in FIG. 6 or the base station shown in FIG. 7.

Referring to FIG. 18, the electronic device 1801 in the network environment 1800 may communicate with an electronic device 1802 via a first network 1898 (e.g., a short-range wireless communication network), or an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input device 1850, a sound output device 1855, a display device 1860, an audio module 1870, a sensor module 1876, an interface 1877, a haptic module 1879, a camera module 1880, a power management module 1888, a battery 1889, a communication module 1890, a subscriber identification module (SIM) 1896, or an antenna module 1897. In some embodiments, at least one (e.g., the display device 1860 or the camera module 1880) of the components may be omitted from the electronic device 1801, or one or more other components may be added in the electronic device 1801. In some embodiments, some of the components may be implemented as single integrated circuitry. For example, the sensor module 1876 (e.g., a fingerprint sensor, an iris sensor, or an illuminance sensor) may be implemented as embedded in the display device 1860 (e.g., a display).

The processor 1820 may execute, for example, software (e.g., a program 1840) to control at least one other component (e.g., a hardware or software component) of the electronic device 1801 coupled with the processor 1820, and may perform various data processing or computation. According to an example embodiment, as at least part of the data processing or computation, the processor 1820 may load a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), and an auxiliary processor 1823 (e.g., a graphics processing unit (GPU), an image signal processor (ISP), a sensor hub processor, or a communication processor (CP)) that is operable independently from, or in conjunction with, the main processor 1821. Additionally or alternatively, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display device 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input device 1850 may receive a command or data to be used by other component (e.g., the processor 1820) of the electronic device 1801, from the outside (e.g., a user) of the electronic device 1801. The input device 1850 may include, for example, a microphone, a mouse, a keyboard, or a digital pen (e.g., a stylus pen).

The sound output device 1855 may output sound signals to the outside of the electronic device 1801. The sound output device 1855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1860 may visually provide information to the outside (e.g., a user) of the electronic device 1801. The display device 1860 may include, for example, a display, a hologram device, or a projector and control circuitry to control a corresponding one of the display, hologram device, and projector. According to an embodiment, the display device 1860 may include touch circuitry adapted to detect a touch, or sensor circuitry (e.g., a pressure sensor) adapted to measure the intensity of force incurred by the touch.

The audio module 1870 may convert a sound into an electrical signal and vice versa. According to an embodiment, the audio module 1870 may obtain the sound via the input device 1850, or output the sound via the sound output device 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to one embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or infrared data association (IrDA)) or the second network 1899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The antenna module 1897 may transmit or receive a signal or power to or from the outside (e.g., the external electronic device) of the electronic device 1801. According to an embodiment, the antenna module 1897 may include an antenna including a radiating element composed of a conductive material or a conductive pattern formed in or on a substrate (e.g., PCB). According to an embodiment, the antenna module 1897 may include a plurality of antennas. In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 and 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One or ordinary skill in the art will understand that various changes in form and details may be made without departing from the spirit and scope of the disclosure and that the various changes should be considered as falling within the scope of the disclosure.

What is claimed is:

1. A method performed by a terminal in a wireless communication system, the method comprising:
   receiving, from a base station, configuration information, wherein the configuration information includes: information on a plurality of first values for indicating a first slot offset between a physical downlink control channel (PDCCH) and a physical downlink shared channel (PDSCH), and information on a plurality of second values for indicating a second slot offset between the PDCCH and a physical uplink shared channel (PUSCH); and
   receiving, from the base station, control information on the PDCCH, wherein the control information includes a value for indicating:
      a first minimum value among the plurality of first values, and
      a second minimum value among the plurality of second values.

2. The method of claim 1, wherein, if the first minimum value is different from an applied minimum value for the first slot offset, the first minimum value is applied after one or more slots.

3. The method of claim 1,
wherein the value corresponds to a 1-bit, wherein the configuration information is received through a higher-layer signaling,
wherein the PDSCH is scheduled by the PDCCH, and
wherein the PUSCH is scheduled by the PDCCH.

4. The method of claim 1, further comprising: when a value for the first slot offset in the control information is smaller than the first minimum value, identifying an error case, and when a value for the second slot offset in the control information is smaller than the second minimum value, identifying an error case.

5. The method of claim 1, wherein, when a value for the first slot offset in the control information is less than the first minimum value, the first minimum value is changed to the value for the first slot offset.

6. A terminal in a wireless communication system, the terminal comprising:
a transceiver; and
at least one processor coupled to the transceiver, wherein the at least one processor is configured to:
receive, from a base station, configuration information, wherein the configuration information includes:
information on a plurality of first values for indicating a first slot offset between a physical downlink control channel (PDCCH) and a physical downlink shared channel (PDSCH),
information on a plurality of second values for indicating a second slot offset between the PDCCH and a physical uplink shared channel (PUSCH), and
receive, from the base station, control information on the PDCCH, wherein the control information includes a value for indicating:
a first minimum value among the plurality of first values, and
a second minimum value among the plurality of second values.

7. The terminal of claim 6, wherein, when the first minimum value is different from an applied minimum value for the first slot offset, the first minimum value is applied after one or more slots.

8. The terminal of claim 6, wherein the value corresponds to a 1-bit,
wherein the configuration information is received through a higher-layer signaling,
wherein the PDSCH is scheduled by the PDCCH, and
wherein the PUSCH is scheduled by the PDCCH.

9. The terminal of claim 6, wherein the at least one processor is further configured to:
if a value for the first slot offset in the control information is smaller than the first minimum value, identify an error case, and
if a value for the second slot offset in the control information is smaller than the second minimum value, identify an error case.

10. The terminal of claim 6,
wherein, if a value for the first slot offset in the control information is less than the first minimum value, the first minimum value is changed to the value for the first slot offset.

11. A method performed by a base station in a communication system, the method comprising:
transmitting, to a terminal, configuration information, wherein the configuration information includes:
information on a plurality of first values for indicating a first slot offset between a physical downlink control channel (PDCCH) and a physical downlink shared channel (PDSCH),
information on a plurality of second values for indicating a second slot offset between the PDCCH and a physical uplink shared channel (PUSCH);
transmitting, to the terminal, control information on the PDCCH, wherein the control information includes a value for indicating:
a first minimum value among the plurality of first values, and
a second minimum value among the plurality of second values.

12. The method of claim 11, wherein, when the first minimum value is different from an applied minimum value for the first slot offset, the first minimum value is applied after one or more slots.

13. The method of claim 11,
wherein the value corresponds to a 1-bit,
wherein the configuration information is received through a higher-layer signaling,
wherein the PDSCH is scheduled by the PDCCH, and
wherein the PUSCH is scheduled by the PDCCH.

14. The method of claim 11,
wherein, when a value for the first slot offset in the control information is smaller than the first minimum value, an error is identified, and
wherein, when a value for the second slot offset in the control information is smaller than the second minimum value, an error is identified.

15. The method of claim 11,
wherein, when a value for the first slot offset in the control information is less than the first minimum value, the first minimum value is changed to the value for the first slot offset.

16. A base station in a wireless communication system, the base station comprising:
a transceiver; and
at least one processor coupled to the transceiver, wherein the at least one processor is configured to:
transmit, to a terminal, configuration information, wherein the configuration information includes:
information on a plurality of first values for indicating a first slot offset between a physical downlink control channel (PDCCH) and a physical downlink shared channel (PDSCH),
information on a plurality of second values for indicating a second slot offset between the PDCCH and a physical uplink shared channel (PUSCH); and
transmit, to the terminal, control information on the PDCCH, wherein the control information includes a value for indicating:
a first minimum value among the plurality of first values, and
a second minimum value among the plurality of second values.

17. The base station of claim 16,
wherein, if the first minimum value is different from an applied minimum value for the first slot offset, the first minimum value is applied after one or more slots.

18. The base station of claim 16,
wherein the value corresponds to a 1-bit, wherein the configuration information is received through a higher-layer signaling,
wherein the PDSCH is scheduled by the PDCCH, and
wherein the PUSCH is scheduled by the PDCCH.

19. The base station of claim 16,
wherein, if a value for the first slot offset in the control information is smaller than the first minimum value, an error is identified, and
wherein, if a value for the second slot offset in the control information is smaller than the second minimum value, an error is identified.

20. The base station of claim 16,
wherein, if a value for the first slot offset in the control information is less than the first minimum value, the first minimum value is changed to the value for the first slot offset.

* * * * *